US008688789B2

(12) United States Patent
Katis et al.

(10) Patent No.: US 8,688,789 B2
(45) Date of Patent: *Apr. 1, 2014

(54) PROGRESSIVE MESSAGING APPARATUS AND METHOD CAPABLE OF SUPPORTING NEAR REAL-TIME COMMUNICATION

(75) Inventors: Thomas E. Katis, Jackson, WY (US); James T. Panttaja, Healdsburg, CA (US); Mary G. Panttaja, Healdsburg, CA (US); Matthew R. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/552,979

(22) Filed: Sep. 2, 2009

(65) Prior Publication Data
US 2010/0198925 A1 Aug. 5, 2010

Related U.S. Application Data

(63) Continuation-in-part of application No. 12/419,861, filed on Apr. 7, 2009, now abandoned, and a continuation-in-part of application No. 12/419,889, filed on Apr. 7, 2009, now abandoned, and a continuation-in-part of application No. 12/419,914, filed on Apr. 7, 2009, now abandoned.

(60) Provisional application No. 61/148,885, filed on Jan. 30, 2009.

(51) Int. Cl.
*G06F 15/16* (2006.01)
(52) U.S. Cl.
USPC .......................................................... 709/206

(58) Field of Classification Search
None
See application file for complete search history.

(56) References Cited

U.S. PATENT DOCUMENTS

| 4,807,224 A | 2/1989 | Naron et al. |
| 5,117,422 A | 5/1992 | Hauptschein et al. |
| 5,128,932 A | 7/1992 | Li |
| 5,283,818 A | 2/1994 | Klausner et al. |

(Continued)

FOREIGN PATENT DOCUMENTS

| GB | 2376112 B | 2/2005 |
| GB | 2418566 A | 3/2006 |

(Continued)

OTHER PUBLICATIONS

Office Action in U.S. Appl. No. 12/419,861, mailed Mar. 30, 2011.

(Continued)

*Primary Examiner* — Scott Christensen
(74) *Attorney, Agent, or Firm* — Beyer Law Group LLP

(57) ABSTRACT

An email client capable of supporting real-time communication of time-based media. The email client includes a session element configured to establish a session with a server when an email address addressing a recipient within a domain is defined. As soon as the email address is defined, a transmitting element of the email client is configured to progressively and simultaneously transmit time-based media as the time-based media is being created to the recipient via a route at least partially discovered by a lookup of the domain of the email address. By at least partially discovering the route to the recipient as soon as the email address of the recipient is defined, the transmitting element may progressively deliver the time-based media to the recipient.

84 Claims, 11 Drawing Sheets

(56) References Cited

U.S. PATENT DOCUMENTS

| | | | |
|---|---|---|---|
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,692,213 A | 11/1997 | Goldberg et al. | |
| 5,734,963 A | 3/1998 | Fitzgerald et al. | |
| 5,737,011 A | 4/1998 | Lukacs | |
| 5,918,158 A | 6/1999 | LaPorta et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,711 A | 8/2000 | Voit | |
| 6,104,757 A | 8/2000 | Rhee | |
| 6,175,619 B1 | 1/2001 | DeSimone | |
| 6,212,535 B1 | 4/2001 | Weikart et al. | |
| 6,233,389 B1 | 5/2001 | Barton et al. | |
| 6,262,994 B1 | 7/2001 | Dirschedl et al. | |
| 6,282,574 B1 | 8/2001 | Voit | |
| 6,335,966 B1 | 1/2002 | Toyoda | |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,671,732 B1 | 12/2003 | Weiner | |
| 6,687,738 B1 | 2/2004 | Hutton et al. | |
| 6,717,925 B1 | 4/2004 | Leppisaari et al. | |
| 6,721,703 B2 | 4/2004 | Jackson et al. | |
| 6,721,784 B1 | 4/2004 | Leonard et al. | |
| 6,731,927 B1 | 5/2004 | Stern et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,002,973 B2 | 2/2006 | MeLampy et al. | |
| 7,039,040 B1 | 5/2006 | Burg | |
| 7,039,675 B1 | 5/2006 | Kato | |
| 7,047,030 B2 | 5/2006 | Forsyth | |
| 7,058,392 B1 | 6/2006 | Weinman, Jr. | |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,228,359 B1 | 6/2007 | Monteiro | |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,283,809 B1 | 10/2007 | Weinman, Jr. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,415,284 B2 | 8/2008 | Hoover et al. | |
| 7,444,306 B2 | 10/2008 | Varble | |
| 7,447,182 B2 | 11/2008 | Chowdhury et al. | |
| 7,509,428 B2 | 3/2009 | McKeeth | |
| 7,626,951 B2 | 12/2009 | Croy et al. | |
| 7,656,836 B2 | 2/2010 | Baker et al. | |
| 7,742,429 B1 | 6/2010 | Huang et al. | |
| 2001/0025377 A1 | 9/2001 | Hinderks | |
| 2001/0043602 A1 | 11/2001 | Brown | |
| 2002/0006802 A1* | 1/2002 | Saarela et al. | 455/466 |
| 2002/0016818 A1 | 2/2002 | Kirani et al. | |
| 2002/0120666 A1 | 8/2002 | Landsman et al. | |
| 2002/0126817 A1* | 9/2002 | Hariri et al. | 379/201.01 |
| 2002/0128029 A1 | 9/2002 | Nishikawa et al. | |
| 2002/0143959 A1 | 10/2002 | El-Baze et al. | |
| 2002/0150094 A1 | 10/2002 | Cheng et al. | |
| 2002/0154745 A1 | 10/2002 | Shtivelman | |
| 2002/0159600 A1 | 10/2002 | Weiner | |
| 2002/0184368 A1 | 12/2002 | Wang | |
| 2003/0027566 A1 | 2/2003 | Weiner | |
| 2003/0028632 A1 | 2/2003 | Davis | |
| 2003/0084106 A1 | 5/2003 | Erev et al. | |
| 2003/0099198 A1 | 5/2003 | Kiremidjian et al. | |
| 2003/0126162 A1 | 7/2003 | Yohe et al. | |
| 2003/0186722 A1 | 10/2003 | Weiner | |
| 2004/0017905 A1 | 1/2004 | Warrier et al. | |
| 2004/0019539 A1 | 1/2004 | Raman et al. | |
| 2004/0074448 A1 | 4/2004 | Bunt | |
| 2004/0090959 A1 | 5/2004 | Cinghita et al. | |
| 2004/0095900 A1 | 5/2004 | Siegel | |
| 2004/0117722 A1 | 6/2004 | Harada | |
| 2004/0170158 A1 | 9/2004 | Man-Hak Tso et al. | |
| 2004/0192353 A1 | 9/2004 | Mason et al. | |
| 2004/0192378 A1 | 9/2004 | Wulkan | |
| 2004/0207870 A1 | 10/2004 | Takahashi et al. | |
| 2004/0213211 A1 | 10/2004 | Green et al. | |
| 2004/0252679 A1 | 12/2004 | Williams et al. | |
| 2004/0255148 A1 | 12/2004 | Monteiro et al. | |
| 2004/0258220 A1 | 12/2004 | Levine et al. | |
| 2005/0021819 A1 | 1/2005 | Kilkki | |
| 2005/0025308 A1 | 2/2005 | Tischer et al. | |
| 2005/0027716 A1 | 2/2005 | Apfel | |
| 2005/0030932 A1 | 2/2005 | Kelly et al. | |
| 2005/0037706 A1 | 2/2005 | Settle | |
| 2005/0053033 A1 | 3/2005 | Kelly et al. | |
| 2005/0076084 A1 | 4/2005 | Loughmiller et al. | |
| 2005/0102358 A1 | 5/2005 | Gold et al. | |
| 2005/0135333 A1 | 6/2005 | Rojas | |
| 2005/0144247 A1 | 6/2005 | Christensen et al. | |
| 2005/0160345 A1 | 7/2005 | Walsh et al. | |
| 2005/0202807 A1 | 9/2005 | Ayyasamy | |
| 2005/0207487 A1 | 9/2005 | Monroe | |
| 2005/0215228 A1 | 9/2005 | Fostick et al. | |
| 2005/0220137 A1 | 10/2005 | Prigent et al. | |
| 2005/0259682 A1 | 11/2005 | Yosef et al. | |
| 2005/0288101 A1 | 12/2005 | Lockton et al. | |
| 2006/0007943 A1 | 1/2006 | Fellman | |
| 2006/0023969 A1 | 2/2006 | Lara et al. | |
| 2006/0045038 A1 | 3/2006 | Kay et al. | |
| 2006/0046740 A1* | 3/2006 | Emami-Nouri et al. | 455/518 |
| 2006/0059199 A1 | 3/2006 | Lappalainen et al. | |
| 2006/0059267 A1 | 3/2006 | Cugi et al. | |
| 2006/0059342 A1 | 3/2006 | Medvinsky et al. | |
| 2006/0093304 A1 | 5/2006 | Battey et al. | |
| 2006/0107285 A1 | 5/2006 | Medvinsky | |
| 2006/0146822 A1 | 7/2006 | Kolakowski et al. | |
| 2006/0153162 A1 | 7/2006 | Croak et al. | |
| 2006/0187897 A1 | 8/2006 | Dabbs et al. | |
| 2006/0189305 A1 | 8/2006 | Ando et al. | |
| 2006/0212582 A1 | 9/2006 | Gupta et al. | |
| 2006/0212592 A1 | 9/2006 | Gupta et al. | |
| 2006/0224748 A1 | 10/2006 | Gupta et al. | |
| 2006/0244588 A1 | 11/2006 | Hannah et al. | |
| 2006/0245367 A1 | 11/2006 | Jeffery et al. | |
| 2006/0253599 A1 | 11/2006 | Monteiro et al. | |
| 2006/0268750 A1 | 11/2006 | Weiner | |
| 2006/0274698 A1 | 12/2006 | Twitchell | |
| 2006/0276714 A1 | 12/2006 | Holt et al. | |
| 2006/0282544 A1 | 12/2006 | Monteiro et al. | |
| 2006/0288391 A1 | 12/2006 | Puthiyedath | |
| 2006/0294259 A1 | 12/2006 | Matefi et al. | |
| 2007/0001869 A1 | 1/2007 | Hunzinger | |
| 2007/0123267 A1 | 5/2007 | Whinnett et al. | |
| 2007/0123284 A1* | 5/2007 | Schliwa-Bertling et al. | 455/518 |
| 2007/0147263 A1 | 6/2007 | Liao et al. | |
| 2007/0155346 A1* | 7/2007 | Mijatovic et al. | 455/90.2 |

(56) References Cited

U.S. PATENT DOCUMENTS

| | | | |
|---|---|---|---|
| 2007/0180032 | A1 | 8/2007 | Pearson |
| 2007/0182819 | A1 | 8/2007 | Monroe |
| 2007/0184868 | A1 | 8/2007 | Allen et al. |
| 2007/0207785 | A1 | 9/2007 | Chatterjee et al. |
| 2008/0000979 | A1 | 1/2008 | Poisner |
| 2008/0002621 | A1 | 1/2008 | Ginzburg et al. |
| 2008/0002691 | A1 | 1/2008 | Qi et al. |
| 2008/0031250 | A1 | 2/2008 | Mehta et al. |
| 2008/0086700 | A1 | 4/2008 | Rodriguez et al. |
| 2008/0134054 | A1 | 6/2008 | Clark et al. |
| 2008/0168173 | A1 | 7/2008 | Munje et al. |
| 2008/0205444 | A1 | 8/2008 | Campbell et al. |
| 2009/0003340 | A1 | 1/2009 | Katis et al. |
| 2009/0037541 | A1 | 2/2009 | Wilson |
| 2009/0049140 | A1 | 2/2009 | Stoddard et al. |
| 2009/0063698 | A1 | 3/2009 | Xu et al. |
| 2009/0175425 | A1 | 7/2009 | Lee |
| 2010/0005168 | A1 | 1/2010 | Williams et al. |
| 2010/0030864 | A1 | 2/2010 | Petry et al. |
| 2010/0312844 | A1 | 12/2010 | Katis et al. |
| 2010/0312845 | A1 | 12/2010 | Katis et al. |
| 2010/0312914 | A1 | 12/2010 | Katis et al. |
| 2011/0010459 | A1 | 1/2011 | Stokking et al. |
| 2011/0019662 | A1 | 1/2011 | Katis et al. |

FOREIGN PATENT DOCUMENTS

| | | |
|---|---|---|
| JP | 2005-348192 | 12/2005 |
| JP | 2007-172264 | 7/2007 |
| WO | WO 01/93503 | 12/2001 |
| WO | WO 02/11398 | 2/2002 |
| WO | WO 03/073642 | 9/2003 |
| WO | WO 2006/114673 | 11/2006 |
| WO | WO 2007/026320 | 3/2007 |

OTHER PUBLICATIONS

Office Action in U.S. Appl. No. 12/419,889, mailed Apr. 14, 2011.
Office Action in U.S. Appl. No. 12/419,914, mailed Dec. 27, 2010.
International Preliminary Report on Patentability in PCT/US2009/057893, mailed Apr. 19, 2011.
"dircproxy," http://home.pcisys.net/~tbc/hacks/dircproxy.htm, Downloaded on Sep. 26, 2008, 1 page.
About.com, "*Linux / Unix Command: talk*,"http://linux.about.com/od/commands/l/blcmdl1_talk.htm, Downloaded on Sep. 26, 2008, 2 pages.
Amir et al., "*An Overlay Architecture for High Quality VoIP Streams*,", IEEE Transactions on Multimedia, Publication Date: Dec. 2006, vol. 8, Issue:6, on pp. 1250-1262.
Apple Inc., "*iPhone User's Guide*," http://manuals.info.apple.com/en_US/iPhone_User_Guide.pdf, Downloaded on Oct. 3, 2008, 154 pages.
Apple Inc., "*iPhone: About Visual Voicemail*," http://www.support.apple.com/kb/HT1486, Downloaded on Sep. 26, 2008, 3 pages.
Baset et al., "*An Analysis of the Skype Peer-to-Peer Internet Telephony Protocol*," INFOCOM 2006. 25th IEEE International Conference on Computer Communications. Proceedings (2006), pp. 1-11.
Brandx.net, "*Using Talk*," http://www.brandx.net/support/usingtelnet/talk.shtml, Downloaded on Sep. 19, 2008, 2 pages.
Business Week, "*Yoomba Ltd.*," http://investing.businessweek.com/research/stocks/private/snapshot.asp?privcapId=34166325, downloaded on Jun. 30, 2009, 3 pages.
Businesswire.com "*LignUp 4.0 Delivers Industry's Most Comprehensive Suite of Communications Web Services*," http://www.businesswire.com/portal/site/google/index.jsp?ndmViewId=news_view& newsId=20070430005498&newsLang=en, Downloaded on Nov. 21, 2008, 10 pages.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
Calore, Michael, "*SpinVox Moves Into VoIP, Brings Voice-to-Text to Skype Users*," Monkey_Bites, http://blog.wired.com/monkeybites/2007/08/spinvox-moves-i.html, Downloaded on Oct. 3, 2008, 4 pages.
Cardei et al., "*MAC Layer QoS Support for Wireless Networks of Unmanned Air Vehicles*," Proceedings of the 37th Hawaii International Conference on System Sciences—2004, Jan. 5-8, 2004 pp. 9 pp.
Cerf et al., "*A Protocol for Packet Network Intercommunication*," Communications, IEEE Transactions on, vol. 22, Issue 5, May 1974 pp. 637-648.
Charny, Ben, "Nextel pushes new 'push to talk' features," URL: http://news.zdnet.com/2100-9584_22-134945.html, Mar. 18, 2004, 3 pages.
Chen et al., "*An Adaptive Multimedia Transmission Protocol for Distributed Multimedia Applications*," Proceedings of the 5th International Workshop on Multimedia Network Systems and Applications (MNSA'2003), in conjunction with The 23rd International Conference on Distributed Computing Systems (ICDCS-2003), 6 pages.
Chuah et al., "*Store-and-Forward Performance in a DTN*," Vehicular Technology Conference, 2006. VTC 2006-Spring. IEEE $63^{rd}$, Publication Date: May 7-10, 2006, vol. 1, on pp. 187-191.
Claburn, Thomas , "*Yoomba Introduces Free Internet Voice Calling Routed Via E-Mail*," Jul. 12, 2007, http://www.informationweek.com/news/internet/showArticle.jhtml?articleID=201000910, downloaded on Jun. 30, 2009, 4 pages.
CNETNews.com, "*Kadoink's phonecast lines officially open for texting*," http://news.cnet.com/8301-17939_109-9829877-2.html, downloaded on Sep. 26, 2008, 1 page.
CruchBase, "*Yoomba*," http://www.crunchbase.com/company/yoomba, downloaded on Jun. 30, 2009, 5 pages.
Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pages.
Digital Inspiration, "*Your Email Address Is Also Your Phone Number with Yoomba*," Jul. 12, 2007, http://labnol.blogspot.com/2007/07/your-email-address-is-also-your-phone.html, downloaded on Jun. 30, 2009, 1 page.
Erwu et al., "*Packet-late indication based (PLIB): adaptive jitter buffer*," ACM International Conference Proceeding Series; vol. 58, Proceedings of the winter international symposium on Information and communication technologies, Cancun, Mexico, Session: Performance, reliability, and quality of service, pp. 1-5 Year of Publication: 2004.
Fall, Kevin, "*A Delay-Tolerant Network Architecture for Challenged Internets*," Feb. 2003, http://www.dtnrg.org/docs/papers/IRB-TR-03-003.pdf, 15 pages.
FAQS.org, "*RFC1644-T/TCP—TCP Extensions for Transactions Functional S*," http://www.faqs.org/rfcs/rfc1644.html, Downloaded on Sep. 19, 2008, 26 pages.
FluidVoice "Overview of Fluid Voice," http://viral.media.mit.edu/wiki/tiki-index.php?page=FluidVoice, Downloaded on Sep. 16, 2008, 2 pages.
Garretson, Cara, "*Call My E-mail, Yoomba Says*," PC World, http://www.pcworld.com/businesscenter/article/134427/call_my_email_yoomba_says.html, Jul. 12, 2007, downloaded on Jun. 30, 2009, 2 pages.
Garrett, Michael, "*Yoomba—Turn Your Email Into a Phone*," Sep. 3, 2007, http://profy.com/2007/09/03/yoomba-turn-your-email-into-a-phone/, downloaded on Jun. 30, 2009, 6 pages.
Gizmo5.com, "*Gizmo5 is a Free Phone for Your Computer*," http://gizmo5.com/pc/products/desktop/, downloaded on Jun. 30, 2009, 2 pages.
Gizmo5.com, "*Gizmo5 is a Free Phone for Your Computer*," http://gizmo5.com/pc/products/tablet/, downloaded on Jun. 30, 2009, 2 pages.
Gizmo5.com, "*Stay in touch, Save some bucks*," http://gizmo5.com/pc/products/mobile/, downloaded on Jun. 30, 2009, 2 pages.
GrandCentral.com, "*Call Record*," http://www.grandcentral.com/howitworks/call_record, Downloaded on Sep. 26, 2008, 1 page.

(56) References Cited

OTHER PUBLICATIONS

GrandCentral.com, "*One Voicemail Box*," http://www.grandcentral.com/home/one_voicemail, Downloaded on Sep. 26, 2008, 1 page.
GrandCentral.com, "*So Many Features, You Won't Believe it*," http://www.grandcentral.com/support/howitworks/, Downloaded on Sep. 26, 2008, 1 page.
GrandCentral.com, "*Voicemail forwarding*," http://www.grandcentral.com/howitworks/voicemail_forwarding, Downloaded on Sep. 26, 2008, 1 page.
Henshall, Stuart, "*HotRecorder—Record Skype Calls*," Skype Journal, URL: http://skypejournal.com/blog/archives/2005/03/hotrecorder_rec.php, Mar. 25, 2005, 11 pages.
HotRecorder.com, "*FAQs*," http://www.hotrecorder.com/music_support.asp, downloaded on Sep. 26, 2008, 1 page.
HotRecorder.com, "*Features*," http://www.hotrecorder.com/music_features.asp, downloaded on Sep. 26, 2008, 1 page.
HotRecorder.com, "*Help*," http://www.hotrecorder.com/music_help.asp, downloaded on Sep. 26, 2008, 3 pages.
IRCHelp.org, "*An IRC Tutorial*," http://www.irchelp.org/irchelp/irctutorial.html, Downloaded on Sep. 26, 2008, 14 pages.
Jabber.org, "*FAQ*," http://www.jabber.org/web/faq, Sep. 4, 2008, downloaded on Sep. 26, 2008, 2 pages.
Jabber.org, "*Main page*," http://www.jabber.org/web/main_page, Sep. 2, 2008, downloaded on Sep. 26, 2008, 1 page.
Jabber.org, "*Products // Jabber Clients*," http://www.jabber.com/CE/JabberClients, downloaded on Sep. 26, 2008, 1 page.
Jabber.org, "*Products // Jabber XCP // Benefits*," http://www.jabber.com/CE/JabberXCPBenefits, downloaded on Sep. 26, 2008, 1 page.
Jabber.org, "*Products // JabberNow*" http://www.jabber.com/CE/JabberNow, downloaded on Sep. 26, 2008, 1 page.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
Kadoink.com, "*Get a Widget*," http://www.kadoink.com/index.cfm?action=getWidgets, Downloaded on Sep. 19, 2008, 3 pages.
Kaplan, Dan, "*Yoomba introduces VoIP and IM directly into your email*," Jul. 12, 2007, http://venturebeat.com/2007/07/12/yoomba-introduces-voip-and-im-directly-into-your-email/, downloaded on Jun. 30, 2009, 2 pages.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
Krishnan et al., "*EVRC-Wideband: The New 3GPP2 Wideband Vocoder Standard*," IEEE International Conference on Acoustics, Speech and Signal Processing, 2007. ICASSP 2007, Publication Dale: Apr. 15-20, 2007, vol. 2, on pp. 11-333-11-336, Honolulu, HI.
Krishnan, et al., "*The SPINDLE Disruption-Tolerant Networking System*," Military Communications Conference, 2007. MILCOM 2007. IEEE Volume, Issue , Oct. 29-31, 2007 pp. 1-7.
Kundan, "*Email based identity in P2P-SIP*," Feb. 24, 2006, http://p2p-sip.blogspot.com/2006/02/email-based-identity-in-p2p-sip.html, downloaded on Jul. 2, 2009, 1 page.
Kundan, "*Peer-to-peer Internet telephony using SIP*," http://p2p-sip.blogspot.com/, downloaded on Jun. 30, 2009, 35 pages.
Labnol.org, "*Turn Your Email Address into a Phone or Messenger with Yoomba*," Jun. 14, 2007, http://www.labnol.org/internet/pressrelease/turn-your-email-address-into-a-phone-or-messenger-with-yoomba/447/, downloaded on Jun. 30, 3009, 1 page.
Layton, Julia, "*How Slingbox Works*," Jan. 4, 2006, HowStuffWorks.com, http://electronics.howstuffworks.com/slingbox.htm, 9 pages.
LignUp.com, "*LignUp Communications Applications Server*," http://www.lignup.com/platform/index.html, Downloaded on Sep. 19, 2008, 1 page.
Linder, Brad, "*Call Skype users from any cellphone, VoIP phone with OpenSky*," Downloadsquad.com, http://www.downloadsquad.com/2009/02/10/call-skype-users-from-any-cellphone-voip-phone-with-opensky/, Feb. 10, 2009, downloaded on Jun. 30, 2009, 11 pages.
Lowekamp et al, "*Authenticated Identity Extensions to dSIP draft-lowekamp-p2psip-dsip-security-00*," Feb. 25, 2007, http://web.archive.org/web/20070501193523/http://www.p2psip.org/drafts/draft-lowekamp-p2psip-dsip-security-00.html, downloaded on Jul. 2, 2009, 14 pages.
Malik, Om, "*Gizmo5 Launches OpenSky, Free Service to Call Skype From Any VoIP Phone*," Gigaom.com, http://gigaom.com/2009/02/09/gizmo5-launches-opensky-free-service-for-calling-skype-from-any-ip-phone/, Feb. 9, 2009, downloaded on Jun. 30, 2009, 5 pages.
Network Dictionary, "*Instant Message (IM) Technology Overview*," http://www.networkdictionary.com/networking/im.php, Downloaded on Sep. 16, 2008, 2 pages.
Nikotalkie.com, "*Nikotalkie—Home*," http://www.nikotalkie.com/, Downloaded on Sep. 19, 2008, 2 pages.
Nikotel.com, "*Click-Pop-Talk WebStart Phone*," http://www.nikotel.com/nikotel-click-pop-talk-java-phone.html, Downloaded on Sep. 19, 2008, 1 page.
Notaras, George, "*Dircproxy IRC Proxy*," http://www.g-loaded.eu/2007/02/01/dircproxy-irc-proxy/, Downloaded on Sep. 26, 2008, 4 pages.
Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.
Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.
Piecuch et al., "*A Selective Retransmission Protocol for Multimedia on the Internet*," In Proceedings of SPIE Multimedia Systems and Applications, Nov. 2000, Boston MA, USA, 12 pages.
Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.
Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603- 606.
Rey et al., "*I-D Action:draft-ietf-avt-rtp-retransmission-09.txt*," Aug. 5, 2003, http://osdir.com/m/ietf.avt/2003-08/msg00003.html, Downloaded on Sep. 19, 2008, 2 pages.
Ribbit.com, "*Amphibian*," http://www.ribbit.com/everyday/, Downloaded on Sep. 26, 2008, 1 page.
Ribbit.com, "*Enhanced Visual Voicemail*," http://www.ribbit.com/everyday/tour/enhanced_visual_voicemail.php, Downloaded on Sep. 26, 2008, 2 pages.
Ribbit.com, "*What is Ribbit? Features*," http://www.ribbit.com/platform/features.php, Downloaded on Sep. 26, 2008, 1 page.
Ribbit.com, "*What is Ribbit? Overview*," http://www.ribbit.com/platform/index.php, Downloaded on Sep. 26, 2008, 1 page.
Ribbit.com, "*What is Ribbit? Voice Architecture*," http://www.ribbit.com/platform/architecture.php, Downloaded on Sep. 26, 2008, 2 pages.
Robertson, Chris, "*The Secret to Making Cheap Telephone Calls Using SMS*," http://www.majon.com/articles/Communications/cheap_telephone_calls_using_SMS_483.html, downloaded on Jun. 30, 2009, 2 pages.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Sahoo, Anirudha, "*Voice Routing*," http://209.85.173.132/search?q=cache:OSV_kGhstDoJ:www.cse.iitb.ac.in/~sahoo/voice_routing_wipro.ppt+DNS+routing+voice&cd=7&hl=en &ct=clnk&gl=us&client=safari, downloaded on Jun. 30, 2009, 23 pages.
Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.
Shinder, Deb, "*Integrate VoIP with your e-mail address—for free*," Techrepublic.com, http://blogs.techrepublic.com.com/networking/?p=299, Jul. 27, 2007, downloaded on Jun. 30, 2009, 3 pages.

(56) References Cited

OTHER PUBLICATIONS

Skype.com, "*Making calls is just the start*," URL: http://www.skype.com/features/, Downloaded on Sep. 6, 2008, 2 pages.

Spinvox.com, "*Home Page*," http://www.spinvox.com/, Downloaded on Sep. 26, 2008, 3 pages.

Spinvox.com, "*How Does it Work?*," http://www.spinvox.com/how_it_works.html, Downloaded on Sep. 19, 2008, 2 pp.

Stern, Joanna, "*Yoomba Bela*," Aug. 16, 2007, http://www.laptopmag.cont/review/software/yoomba-beta.aspx, downloaded on Jun. 30, 2009, 3 pages.

Swissvoice.net, "*PSTN*," http://www.swissvoice.net/ww/htm_ww/08_technology/content_pstn.html, Downloaded on Sep. 19, 2008, 3 pages.

Tektronix, "*VOIP Technology Overview; Protocols, Convergence, Testing*," http://www.tektronics.com/voip, May 12, 2006.

The Jabber Extensible Communications Platform™, "*Products // Jabber XCP*," URL: http://www.jabber.com/CE/JabberXCP, Downloaded on Sep. 16, 2008, 2 pages.

ThunkDifferent.com, "*YouMail vs. Google Grandcentral Voice Mail Service*," http://thunkdifferent.com/2007/10/11/youmail-vs-google-grandcentral-voice-mail-service/, Downloaded on Oct. 3, 2008, 6 pages.

TradeVibes, "*Yoomba Overview*," http://www.tradevibes.com/company/profile/yoomba, downloaded on Jun. 30, 2009, 3 pages.

Vaudreuil, G., "*Voice Message Routing Service*," ietf. org, http://www.ietf.org/rfc/rfc4238.txt, Oct. 2005, downloaded on Apr. 20, 2009, 10 pages.

Voip-News.com, "*Company Profile—LignUp*," http://www.voip-news.com/vendors/lignup/, Downloaded on Oct. 3, 2008, 6 pages.

Voip-News.com, "*Company Profile, LignUp*," http://www.voip-news.com/vendors/lignup/, Downloaded on Dec. 5, 2008, 6 pages.

WikiBooks, "*Internet Technologies/IRC*," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Push to Talk*" http://en.wikipedia.org/wiki/Push_to_talk, Downloaded on Sep. 26, 2008, 3 pages.

WikiPedia—The Free Encyclopedia, "*Skype Protocol*," http://en.wikipedia.org/wiki/Skype, Downloaded on Sep. 26, 2008, 4 pages.

WikiPedia—The Free Encyclopedia, "*Skype*," http://en.wikipedia.org/wiki/Skype, Downloaded on Sep. 26, 2008, 7 pages.

WikiPedia—The Free Encyclopedia, "*Slingbox*" http://en.wikipedia.org/wiki/Slingbox, Downloaded on Sep. 26, 2008, 4 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*," http://en.wikipedia.org/wiki/TiVo, Downloaded on Sep. 16, 2008, 6 pages.

WikiPedia—The Free Encyclopedia, "*Visual Voicemail*" http://en.wikipedia.org/wiki/Visual_voicemail, downloaded on Sep. 26, 2008, 1 page.

Yakuel, Orli, "*Yoomba—Calling all Emails*," GO2WEB20 Blog, http://blog.go2web20.net/2007/09/yoomba-calling-all-emails.html, Sep. 27, 2007, downloaded on Jun. 30, 2009, 5 pages.

Yavuz et al., "*VoIP over cdma2000 1 xEV-DO Revision A*," IEEE Communications Magazine, Feb. 2006, pp. 88-95.

Zangrilli et al., "*A Bamboo-based DHT for Resource Lookup in P2PSIP draft-zangrilli-p2psip-dsip-dhtbamboo-00*," Feb. 25, 2007, http://web.archive.org/web/20070501193747/http://www.p2psip.org/drafts/draft-zangrilli-p2psip-dsip-dhtbamboo-00.html, downloaded on Jul. 2, 2009.

U.S. Appl. No. 12/419,861, filed Apr. 7, 2009.

U.S. Appl. No. 12/419,889, filed Apr. 7, 2009.

U.S. Appl. No. 12/419,914, filed Apr. 7, 2009.

U.S. Appl. No. 12/552,980, filed Sep. 2, 2009.

International Search Report in PCT/US2009/057893, mailed Apr. 21, 2010.

Written Opinion in PCT/US2009/057893, mailed Apr. 21, 2010.

WikiPedia—The Free Encyclopedia, "*Eudora (email client)*," http://en.wikipedia.org/wiki/Eudora_(e-mail_client), Downloaded on Aug. 20, 2009, 3 pages.

"*Eudora*," Answers.com, http://www.answers.com/topic/eudora-e-mail-client, Downloaded on Aug. 20, 2009, 4 pages.

"*The Eudora Open Messaging Advantage*," Qualcomm, 1997, Part No. 100-50030-1, 23 pages.

"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.

"*Aspera—Next Generation File Transport—fasp™ transfer times*," Asperasoft.com, http://www.asperasoft.com/en/technology/fasp_transfer_times_14/fasp_transfer_times_14, Downloaded on Sep. 22, 2009, 1 page.

"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.

"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep.22, 2009, 2 pages.

"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.

"*Aspera fasp™ High Speed Transport—A Critical Technology Comparison*," White Paper, Asperasoft.com, http://www.asperasoft.com/en/technology/white_papers_13/aspera_fasp_high_speed_transport_13, Downloaded on Sep. 22, 2009, 11 pages.

"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.

*Palringo—Features*, Palringo.com, http://www.palringo.com/en/gb/features/, Downloaded on Aug. 13, 2009, 1 page.

Moren, Dan, "*Palringo Brings Picture Messaging to Iphone*," http://www.pcworld.com/article/149108/palringo_brings_picture_messaging_to_iphone.html, Downloaded on Aug. 13, 2009, 3 pages.

Paul, Ryan, "*Gmail gets Google Talk integration*,"Arstechnica.com, http://arstechnica.com/old/content/2006/02 6128.ars , Downloaded on Aug. 20, 2009, 1 page.

Sherman, Chris, "*Google Integrates Chat with Gmail*,"Search Engine Watch, http://searchenginewatch.com/3583121, Feb. 7, 2006, Downloaded on Aug. 20, 2009, 2 pages.

"*About Gmail*," http://mail.google.com/mail/help/chat.html, Downloaded on Aug. 20, 2009, 3 pages.

WikiPedia—The Free Encyclopedia, "*Google Talk*," http://en.wikipedia.org/wiki/Google_Talk, Downloaded on Aug. 20, 2009, 8 pages.

Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.

WikiPedia—The Free Encyclopedia, "*Palringo*" http://en.wikipedia.org/wiki/Palringo, Downloaded on Aug. 13, 2009, 1 page.

Final Office Action in U.S. Appl. No. 12/419,914 mailed Jun. 10, 2011.

Office Action in U.S. 12/419,889, mailed Aug. 3, 2011.

Office Action in U.S. Appl. No. 12/419,861, dated Sep. 7, 2011.

Office Action in U.S. Appl. No. 12/419,914, mailed Sep. 15, 2011.

Rosenberg, J. et al., "*SIP: Session Initiation Protocol*," The Internet Society, Jun. 2002, 270 pages.

Office Action in U.S. Appl. No. 12/419,914, mailed Jan. 30, 2012.

(56) References Cited

OTHER PUBLICATIONS

Wikipedia encyclopedia definition "User Datagram Protocol" http://en.wikipedia.org/wiki/User_Datagram_Protocol, last modified Mar. 9, 2012.
Office Action in U.S. Appl. No.12/419,889, mailed Mar. 13, 2012.
Office Action in U.S. Appl. No. 12/419,861, dated Mar. 8, 2012.
European Search Report mailed Jan. 6, 2012 in EP application 11174497.
Notice of Allowance in U.S. 12/419,861, dated Apr. 18, 2012.
Office Action in U.S. Appl. No. 12/857,498, dated May 2, 2012.
Office Action in U.S. Appl. No. 12/419,914, dated May 10, 2012.
Office Action in U.S. Appl. No. 12/552,980, dated May 18, 2012.
Office Action in U.S. Appl. No. 12/419,889, dated Jun. 13, 2012.
Office Action in U.S. Appl. No. 13/551,239, dated Oct. 16, 2012.
Office Action in U.S. Appl. No. 12/857,454, dated Nov. 15, 2012.
Office Action in U.S. Appl. No. 12/552,980, dated Nov. 16, 2012.
Office Action in U.S. Appl. No. 12/857,486, dated Dec. 10, 2012.
Office Action in U.S. Appl. No. 12/857,498, dated Jan. 7, 2013.
Office Action in U.S. Appl. No. 12/857,454, dated Jun. 3, 2013.
Office Action in U.S. Appl. No. 12/552,980, dated Mar. 13, 2013.
Office Action in U.S. Appl. No. 12/857,486, dated May 23, 2013.
Allen et al., "The P-Answer-State Header Extension to the Session Initiation Protocol for the Open Mobile Alliance Push to Talk over Cellular," URL: http://tools.ietf.org/html/rfc4964, Sep. 2007, 32 pages.
Japanese Office Action dated Nov. 5, 2013 from Japanese Application No. 2011-547919.
Australian Office Action dated Nov. 12, 2013 from Australian Application No. 2009338743.
U.S. Office Action dated Jun. 13, 2013 from U.S. Appl. No. 12/552,980.

\* cited by examiner

Figures 8, 9:
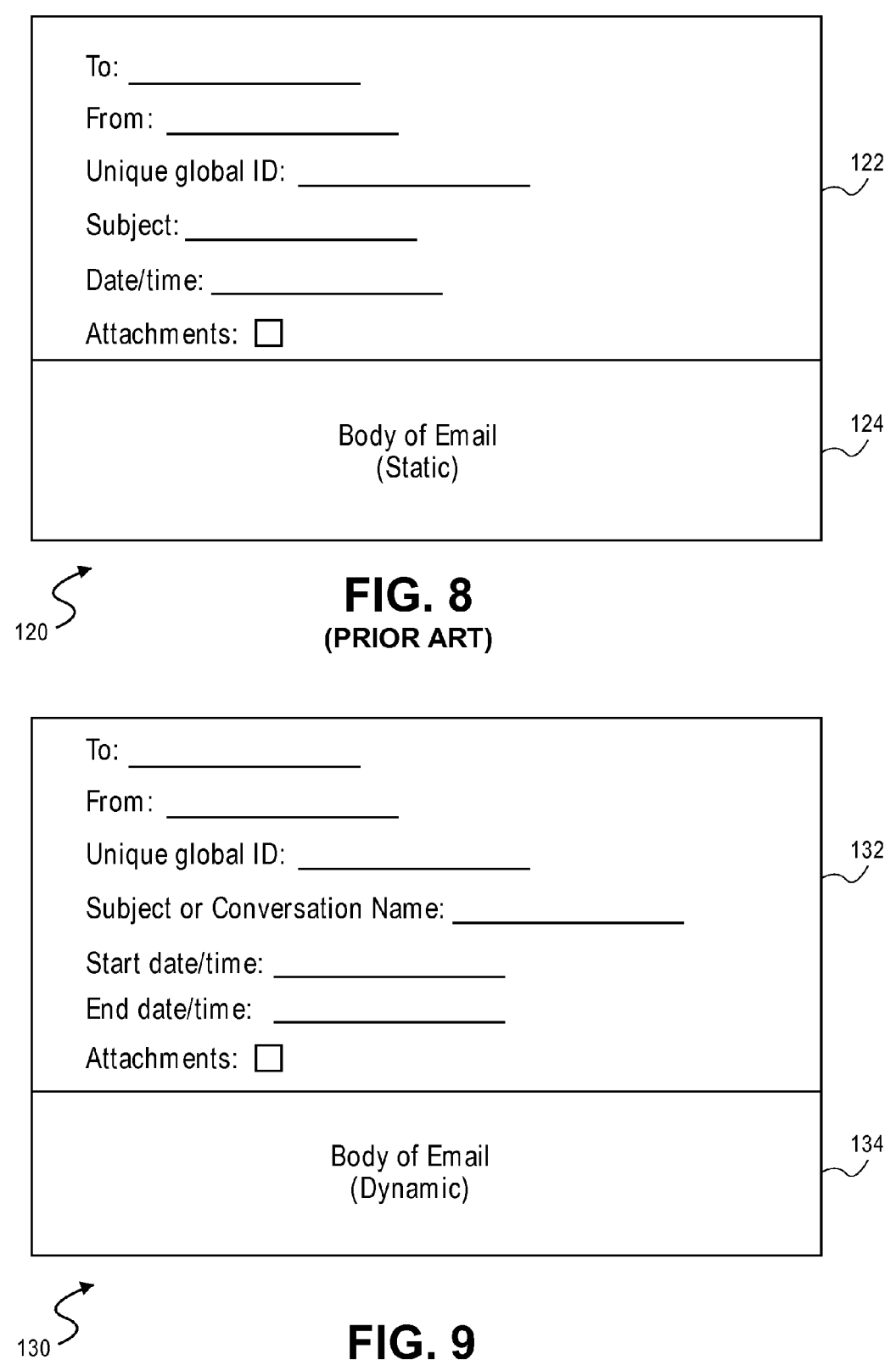

To: _____

From: _____

Unique global ID: _____

Subject: _____

Date/time: _____

Attachments: ☐

Body of Email
(Static)

From: _____

Unique global ID: _____

Subject or Conversation Name: _____

Start date/time: _____

End date/time: _____

Attachments: ☐

Body of Email
(Dynamic)

PROGRESSIVE MESSAGING APPARATUS AND METHOD CAPABLE OF SUPPORTING NEAR REAL-TIME COMMUNICATION

CROSS-REFERENCE TO RELATED APPLICATIONS

This application claims the benefit of priority to U.S. Provisional Patent Application No. 61/148,885 filed Jan. 30, 2009, entitled "Extending Email to Support the Communication of Time-based Media in Near Real-time." This application is also a continuation-in-part of U.S. Non-Provisional patent application Ser. Nos. 12/419,861, 12/419,889, and 12/419,914, each filed Apr. 7, 2009, and each entitled "Methods for Using the Addressing, Protocols, and the Infrastructure of Email to Support Near Real-time Communication." All of the above-listed Provisional and Non-Provisional applications are incorporated herein by reference for all purposes.

BACKGROUND

1. Field of the Invention

This invention pertains to communications, and more particularly, to an email client capable of supporting near real-time communication of time-based media.

2. Description of Related Art

Currently there are three globally used addressing domains. The postal system, which is mainly used for the delivery of letters and parcels, relies on the use of a physical address, such as a house address, office building address or Post Office (PO) box. In order to assure the delivery of a letter or parcel, the physical address of the recipient must be provided, including a country, state or territory, a city or town, postal or zip code, street name and street number. The existing telephone infrastructure defines another global addressing domain that has historically been used for near real-time voice communications (i.e., telephone calls). Both land-line and mobile telephones are addressed (i.e., called) using a telephone number, which typically includes a country code and a variable number of additional digits to identify a particular phone within a given country and/or area code. When a circuit connection is made between the calling parties, a full duplex conversation may take place. A third global addressing system is email. Every email account is identified by a unique globally addressable email address, which defines a user name and a domain name.

Emails are typically text messages that are sent from a sender to one or more recipients. The emails are created on an email client. One well-known email client is Microsoft Outlook, which is used to create, receive and manage email messages on a computer. Alternatively, free email services like Yahoo, Google or Hotmail are available to users through a web page. Regardless of the type used, an email client will typically (i) list or display all the received messages, with an email header showing the subject of the email, the sender of the email, the date/time it was sent and possibly other attributes such as the size of the email; (ii) allow the user to select messages for review; (iii) allow the user to type and send new messages to recipients and reply to the received emails of others; and (iv) allow attachments, such as still photos, documents, or video clips, to be attached to an outgoing email.

An email message must first be created in full before it can be sent. A sender will typically first define a recipient by entering their email address into the appropriate "To" field in the header of the email. The text message is then typed into the body of the email and files may optionally be attached. When the message is complete, the user sends the email. During the send sequence, the email client initiates a session with its email server located on a network. This session is typically established with the Simple Mail Transport Protocol (SMTP). During the session, the email client provides the SMTP server with the email address of the sender, the email address of the recipient, and the body of the email with any attachments. The email addresses of the recipient is segmented into two parts, including the recipient's name (e.g., "jsmith") and the domain name (e.g., "hotmail.com"). If the recipient is in a domain that the SMTP server controls, then the server carries out delivery instructions for the specific recipient, which is typically delivery of the email to an in-box associated with the recipient on the same SMTP server or another server located in the same domain. On the other hand if the recipient is in a domain that the server does not control, then the email server needs to communicate with a server that controls the recipient's domain using SMTP.

To send the email to the recipient in another domain, the SMTP server initiates a conversation with the Domain Name System (DNS), asking for the Mail eXchanger (MX) record of the recipient's domain. This MX record contains a prioritized list of SMTP servers for that domain. The email is then sent from the SMTP server of the sender to the first SMTP server in the MX list that responds. This first responding server then determines if the recipient is in the domain the first responding server controls. If so, the email is delivered to the inbox of the recipient. If not, the above-described process is repeated until a responding server is the one that can deliver the message into the recipient's inbox. Each server along the delivery route is sometimes referred to as a "hop". The email may then be accessed through the email client of the recipient, which may be located on the computer of the recipient or on the Internet. If an email is sent to multiple parties, the above-described process is repeated for each recipient.

The above-described sequence generally applies for emails sent over the Internet. With certain proprietary systems, such as an email sent between two Microsoft Exchange users on the same proprietary network, the SMTP protocol may not be used for routing the email but email addresses are still used. The operation of the proprietary protocol and server is essentially the same as SMTP.

The existing email infrastructure, regardless if it relies on SMTP or a proprietary email protocol, is essentially a "store and forward" messaging system. An email message must first be created in its entirety before it can be sent. At the SMTP or proprietary mail server of the sender, as well as any intermediate email server hops along the path to the SMTP or proprietary mail server of the recipient, the email message must be received in full before it can be forwarded. Finally the email must be received in full at the inbox of the recipient before the recipient can review the message.

By way of comparison, telephone conversations over the Public Switched Telephone Network (PSTN) are progressive in nature. As words are spoken, they are simultaneously transmitted from the sender to the recipient, where they are heard effectively live or near real-time. As a result, telephone conversations can be conducted in a "live" or near real-time mode through a common network connection (i.e., a circuit). Email communication in contrast usually occurs through a series of separate store and forward messages, often sent back and forth between two or more parties at distinct times, across a network, such as the Internet.

It is well known to attach a file to an email containing time-based media (i.e., media that changes with respect to time), such as a video clip. The time-based media attached to an email message, however, can never be reviewed by a recipient "live", as it is being created, due to the store and forward nature of email. Rather the email and the attachment containing the time-based media must first be created, sent, stored and forwarded at each email server hop on the network, and then received by the recipient in full before the time-based media of the attachment can be reviewed. It is therefore not possible for the recipient of an email message to review the media in near real-time as the media is being created.

Telephone messaging systems are also known where a voice message may be created and sent to a recipient in the form of an email. With these systems, the Public Switched Telephone Network (PSTN) is used in cooperation with emails. In use, a recording of the message must first be made, stored, and then forwarded to the recipient by email. Again, however, the message must first be received in full before the recipient can review the recorded message.

Instant messaging or IM is another example of a store and forward system. Similar to email as described above, messages must be completed before they can be forwarded to a recipient. Messages in IM systems are generally much shorter than those sent via email. Each line of text in IM systems is a separate message delivered in a store and forward manner. Existing IM systems do not provide a way for a recipient to progressively and simultaneously review a message as the sender creates the message.

Live text systems are well known, although they were mostly used on early Unix systems with dumb terminal interfaces. In a live text system, each individual keystroke is sent to the recipient as soon as the sender pressed that key. These systems are for text only, but they do allow the recipient to progressively review a message as the message is being created.

Currently there is no known system or method for extending the global addressing and routing infrastructure of email to support the live or near real-time communication of time-based media between a sender and a recipient using their email addresses.

SUMMARY OF THE INVENTION

An email client capable of supporting real-time communication of time-based media is disclosed. The email client includes a session element configured to establish a session with a server when an email address addressing a recipient within a domain is defined. As soon as the email address is defined, a transmitting element of the email client is configured to progressively and simultaneously transmit time-based media as the time-based media is being created to the recipient via a route at least partially discovered by a lookup of the domain of the email address. By at least partially discovering the route to the recipient as soon as the email address of the recipient is defined, the transmitting element may progressively deliver the time-based media to the recipient.

BRIEF DESCRIPTION OF THE DRAWINGS

The invention may best be understood by reference to the following description taken in conjunction with the accompanying drawings, which illustrate specific embodiments of the invention.

FIG. 8 is a diagram illustrating the structure of a conventional email according to the prior art.

FIG. 9 is a diagram of the structure of a progressive email according to the present invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The present application is directed to a number of embodiments, including (i) the use of the email and DNS infrastructure to define the routing for the delivery of messages containing time-based media while using a near real-time communication protocol for the actual delivery of the media; (ii) various delivery options of messages containing time-based media using email addressing and DNS; (iii) the modification of SMTP or other proprietary email protocols to support the transmission of "progressive" emails containing time-based media; (iv) the late binding of recipient email addresses for near real-time voice or other time-based media communication; and (v) conducting near real-time conversations by routing messages or progressive emails containing time-based media using globally addressable email addresses and DNS. Each of these aspects are described in detail below.

Figure 1:
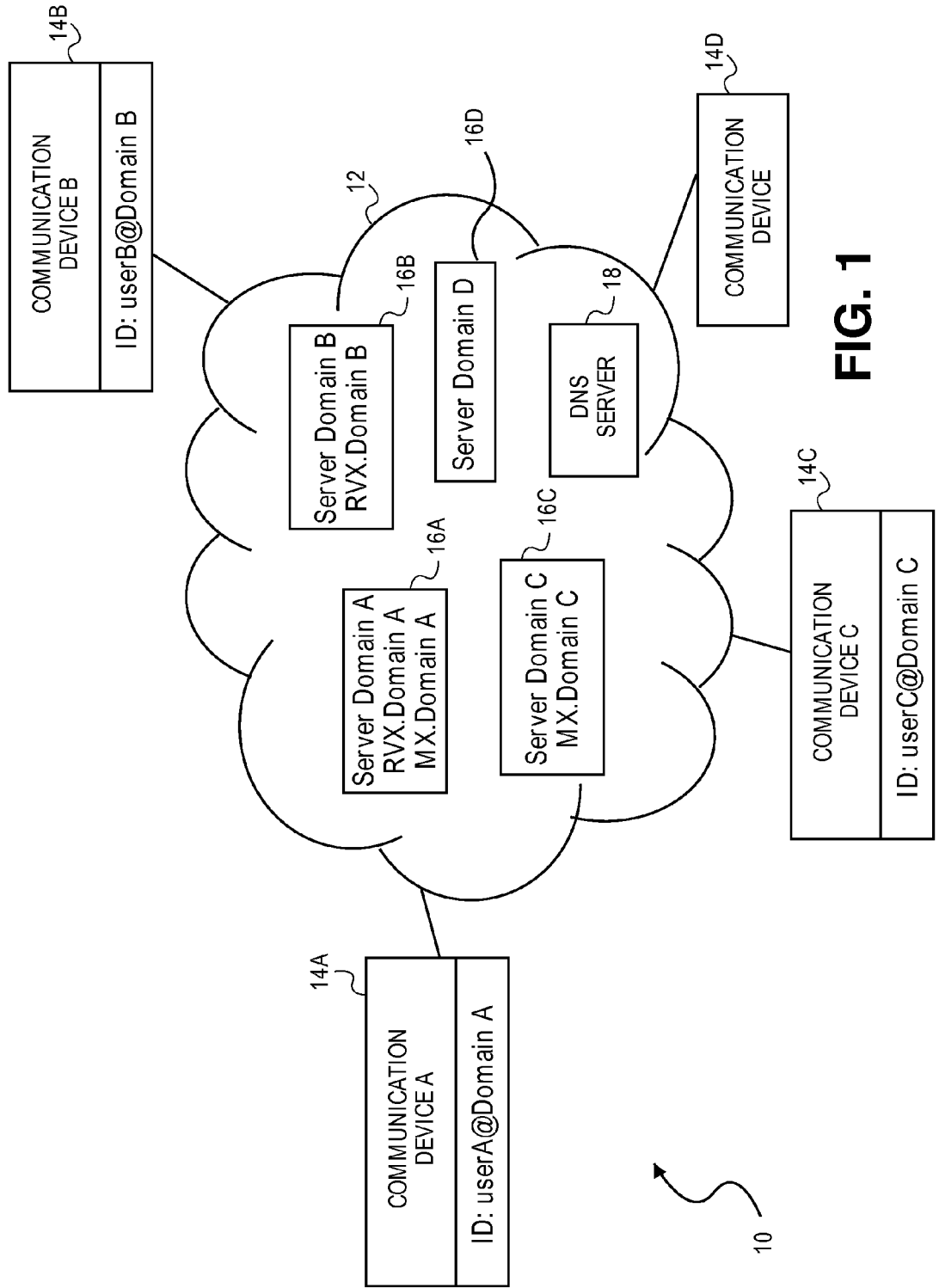
FIG. 1 is a diagram of a network capable of supporting live or near real-time communication of time-based media between users according to the present invention.

I. The Use of the Email and DNS Infrastructure to Define the Routing for the Delivery of Messages Containing Time-Based Media Using a Near Real-Time Communication Protocol for the Actual Delivery of the Media Referring to FIG. 1, a diagram of a network system capable of (i) supporting "live" or near real-time communication of time-based media and (ii) routing using the infrastructure of email and DNS according to the present invention is shown. The system 10 includes a network 12 with users A, B, C and D using communication devices 14A, 14B, 14C and 14D and Servers 16A, 16B, 16C and 16D located on the network 12. The network 12 further includes a DNS server 18. In various embodiments, the network 12 may include the Internet, an intranet, a mobile IP network, or any other type of network that relies on the Internet Protocol and/or DNS, or any combination thereof. Users A, B and C are each addressed by the servers 16A through 16D by their respective globally addressable email addresses "UserA@Domain A", "UserB@Domain B", and "UserC@Domain C". User D is intentionally not identified on the network 12 by a globally addressable email address for reasons mentioned below.

The Servers 16A, 16B, 16C and 16D are each configured to provide one or more services to Users A, B, C and D respectively. In this example, Server A defines Domain A and provides User A with the standard email delivery service using SMTP (or a similar proprietary service) and MX DNS records, hereafter referred to as "MX". Server A further provides User A with a real-time communication service, hereafter referred to as "RVX". Server 16B defines Domain B and provides User B with the real-time communication service RVX, but not the email service MX. Server 16C defines Domain C and provides User C with the email service MX, but not the real-time domain RVX service. Server 16D does not provide user D with either the real-time communication service RVX nor the email domain MX service, but other services that are not identified because they are not relevant.

In one embodiment, the real-time service RVX may rely on any communication protocol that allows users to communicate time-based media in near real-time, but does not require the recipient to review the time-based media in a near real-time mode. Known protocols with these properties include the Cooperative Transmission Protocol (CTP) described in detail in the U.S. application Ser. No. 12/028,400 and Ser. No. 12/192,890 or the near real-time synchronization protocol of voice or other time-based media as described in U.S. application Ser. Nos. 12/253,816, 12/253,833 and 12/253,842. The above-listed U.S. applications are assigned to the assignee of the present invention and are incorporated herein by reference for all purposes.

In alternate embodiments, the RVX service may rely on other communications protocols, individually or in combination, that provide near real-time communication, such as SIP, RTP, Skype, VoIP, etc.

The communication devices 14A through 14D may each be any type of communication device, such as land-line telephones, VoIP telephones, cellular radios, satellite radios, military or first responder radios, mobile Internet devices, or just about any other type of communication device. In addition, a given user might have multiple communication devices 14. For example, a user may have one or more of the following; a home computer, a work computer, a Push to Talk radio, a mobile phone or a personal digital assistant (PDA). Regardless of the number of communication devices 14 each user A, B, C and D has, each will operate essentially the same and receive the services provided by the servers 16A, 16B, 16C and 16D as described herein respectively.

It should be noted that the system 10 as illustrated has been greatly simplified compared to what would typically be implemented in actual embodiments. For the sake of illustration, the RVX and MX services as (or not) provided to Users A, B, C and D as listed above have been purposely selected to highlight and describe various features and aspects of the present invention. In actual embodiments, however, there would likely be a significantly larger number of users, each with one or more communication devices 14 and associated servers on the network 12, providing a variety of services to each user. In addition, any combination ranging from a single server or a suite of servers 16 may be included on the network 12 to provide the RVX and/or MX for one to multiple users respectively. The communication devices 14A, 14B and 14C and the servers 16A, 16B and 16C may also communicate with one another in a manner similar to that described above using DNS, SMTP, or other proprietary email protocols for route discovery across one or more hops on the network 12. The delivery route for a message to a recipient in the same domain is typically delivered to an inbox on the same server 16 or an associated server in the same domain. A message sent to a recipient in another domain will typically be sent to the email server of the recipient via one or more hops across the network 12. As the routing of emails and media in near real-time across an IP network is well known in the art, a detailed explanation is not provided herein.

Figure 2:
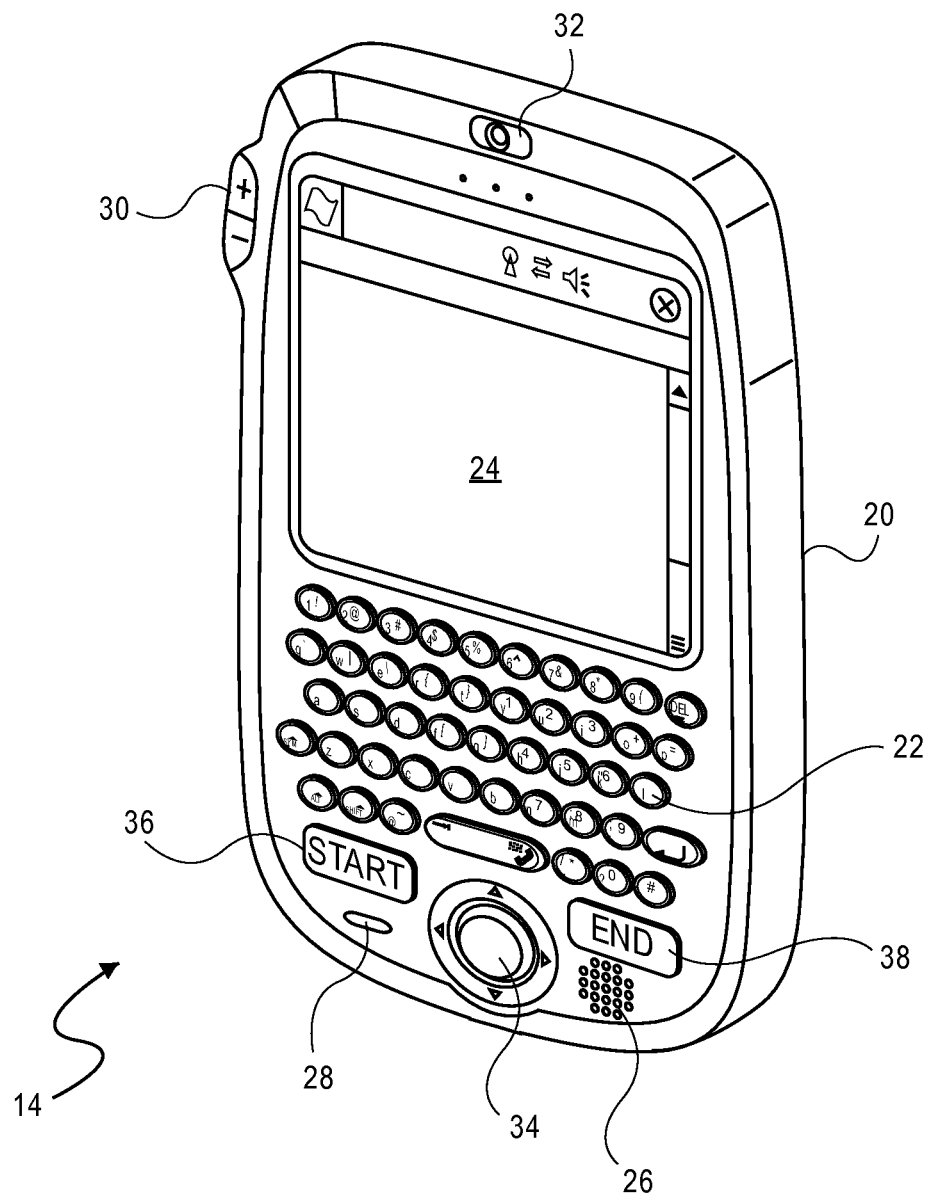
FIG. 2 is a diagram of a communication device according to one embodiment of the present invention.

Referring to FIG. 2, a diagram of a communication device 14 according to one embodiment of the present invention is shown. In this embodiment, the communication device 14 is a mobile device 20 capable of wirelessly communicating with the network 12, such as a mobile phone or PTT radio. The mobile device 20 may optionally include one or more of the following; a keypad 22, a display 24, speaker 26, microphone 28, volume control 30, camera 32 capable of generating still photos and/or video, a display control element 34, a start function element 36 and an end function element 38. In various embodiments, the device 20 (i) is IP based, meaning it is designed to communicate over the network 12 using the Internet Protocol and (ii) runs one or more RVX protocols, including any of those listed above or any other near real-time communication protocol. In addition, the device 20 may optionally also locally run an email client, access an email client located on one of the servers 16 located on the network 12, or be capable of both running and accessing an email client on the network.

Figure 3:
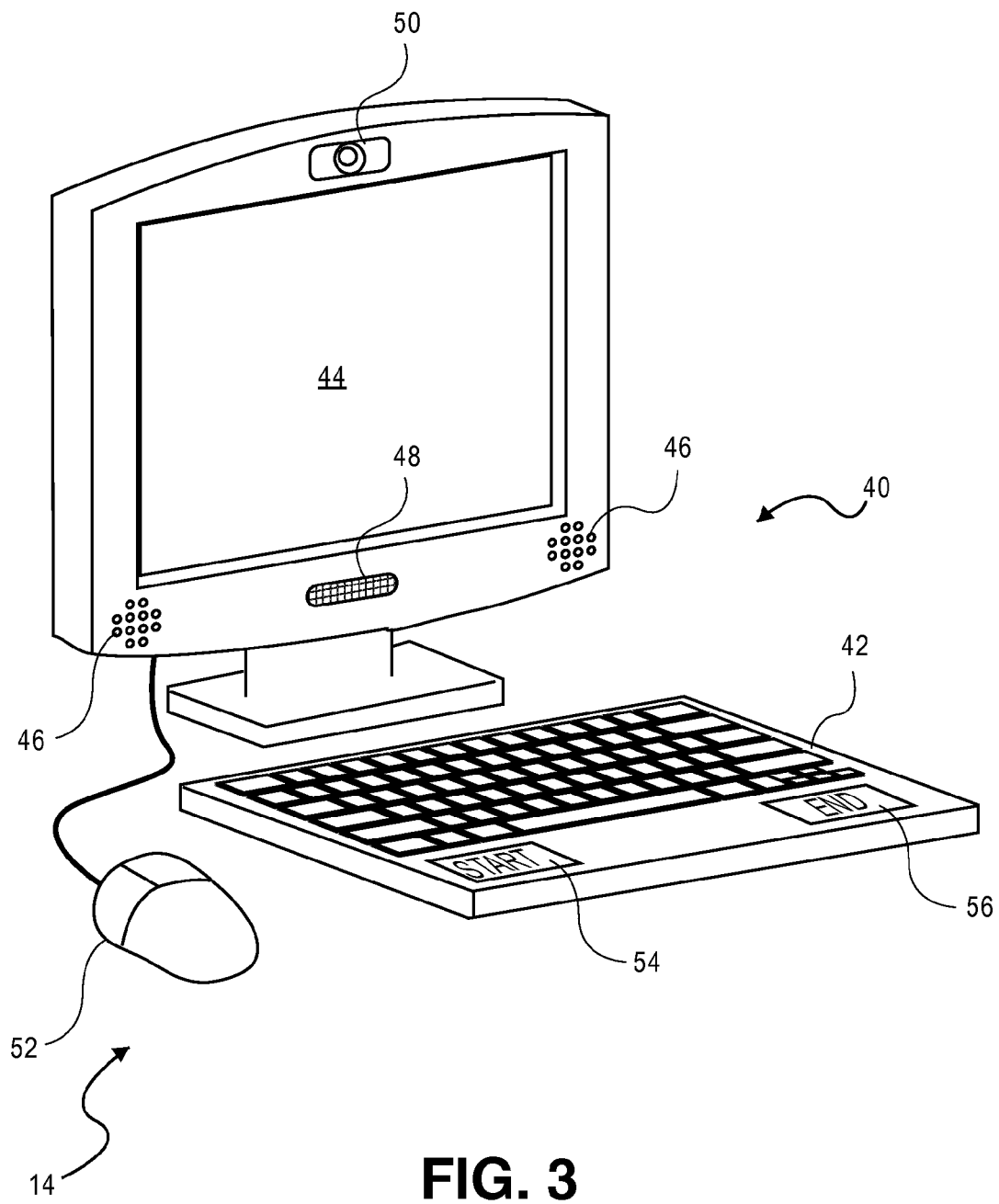
FIG. 3 is a diagram of a communication device according to another embodiment of the present invention.

Referring to FIG. 3, a diagram of a communication device according to another embodiment of the present invention is shown. In this embodiment, the communication device 14 is a computer 40 connected to the network 12, either through a wired or wireless connection (not shown). The computer 40 optionally includes one or more of the following; a keyboard 42, a display 44, speakers 46, a microphone 48, a camera 50 capable of generating still photos or video, a mouse 52, a start function element 54 and an end function element 56. The computer 40 is capable of running an email client, accessing an email client located on the network 12, or both. In various embodiments, the computer 40 (i) is IP based, meaning it is designed to communicate over the network 12 using the Internet Protocol and (ii) runs one or more RVX protocols, including any of those listed above or any other near real-time communication protocol. Further, the computer 40 could be a portable computer, such as a laptop or personal digital assistant, and is not limited to the desktop computer as shown. In addition, the device 40 may optionally also locally run an email client, access an email client located on one of the servers 16 located on the network 12, or be capable of both running and accessing email client on the network.

The start function elements 36/54 and the end function elements 38/56 of the mobile device 20 and computer 40 are meant to be symbolic of their respective functions. It is not necessary for mobile device 20, computer 40, or any other type of communication device 14, to physically include start and end buttons per se. Rather, it should be understood that each of these functions might be implemented in a variety of ways, for example, by entering a voice command, a pre-defined keystroke or command using a touch screen or other input device such as a mouse, stylus or pointer, etc.

The network 12 uses the existing email infrastructure, including the globally recognizable email addresses of the recipient users and DNS for route discovery, while using a near real-time RVX protocol for the actual transport of messages containing time-based media to the addressed recipient once the route is discovered. Like conventional emails, each message relies on a header that defines, among other things, a globally addressable email address of one or more recipients for routing purposes. Unlike conventional store and forward emails, however, the time-based media of the message is transmitted using a near real-time RVX protocol. As a result, time-based media may be simultaneously and progressively transmitted across the network 12, as the sender creates the media. In addition, the recipient may optionally simultaneously and progressively render the time-based media as it is received over the network. When two or more parties are conversing (e.g., generating and reviewing time-based media) at the same time, the network 12 is supporting near real-time communication using an RVX protocol for media delivery, while using the existing email infrastructure and DNS for routing.

Figures 4A, 4B:
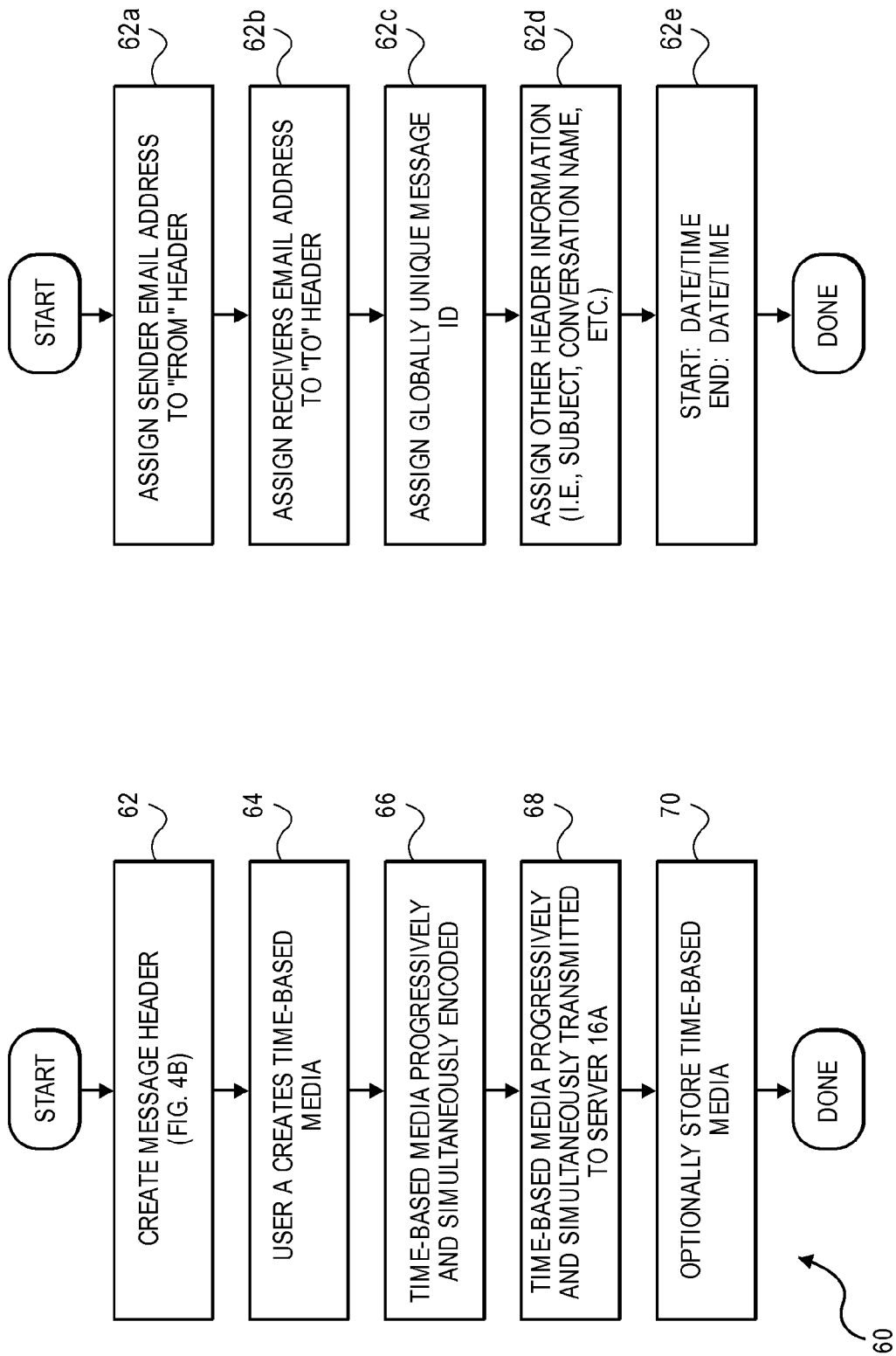
FIGS. 4A and 4B are flow diagrams illustrating the sequence of creating an email header on a communication device of the present invention.

Referring to FIG. 4A, a flow diagram illustrating the sequence of creating and transmitting time-based media associated with a message on a communication device 14 is shown. If the user of a communication device 14 wishes to communicate with a particular recipient, the user will either select the recipient from their list of contacts or reply to an already received message from the intended recipient. If a message from the intended recipient is not available for responding or if the intended recipient is not already in the contact list, the globally addressable email address of the recipient is manually entered into the device 14.

In response to any of the above, a message header is created (step 62), including the globally addressable email address of the recipient in a "To" header. As soon as the globally addressable email address of the recipient is defined, a DNS lookup is performed, so that the route for delivering the media associated with the message to the globally addressed recipient is immediately discovered. Thereafter, a user may initiate the start function 36/54 and begin creating time-based media (step 64), for example by speaking into the microphone, generating video, or both. The time-based media is then progressively and simultaneously encoded (step 66), transmitted (step 68) over the network 12 using an RVX protocol using the discovered delivery route, and optionally persistently stored on the device 14 (step 70). It should be noted that although these steps 62 through 70 are illustrated in the diagram in a sequence, for all practical purposes they occur at substantially the same time. The user may select a recipient from a contacts list, initiate the start function 36/54, and then begin speaking immediately. As the media is created, the RVX protocol progressively and simultaneously transmits the media across the network 12 to the recipient, using the DNS lookup result to discover the route without any perceptible delay to the sending user.

The time-based media of outgoing messages may optionally be persistently stored on the sending communication device 14 for a number of reasons. For example, if time-based media of a message is created before the delivery route is discovered, then the time-based media may be transmitted from storage when the delivery route is discovered. If time-based media is still being created after the route is discovered, then the time-based media is transmitted progressively and simultaneously as the media is being created. Alternatively with the storage of time-based media, the sender may review stored messages at an arbitrary later time. A message may also be created and stored when the communication device 14 is not connected to the network 12, where connected is defined as the ability to send messages over the network and not connected is defined as the inability to send messages over the network. When the device 14 later connects, the message may be transmitted to the intended recipient from storage, using either an RVX protocol or as an attachment to an email.

Referring to FIG. 4B, a flow diagram 100 illustrating the sequence for creating a message header (step 62 in FIG. 4A) is shown. In the step 62a, the globally addressable email address of the sender is provided in the "From" field of the message header. In step 62b, the globally addressable email address of the recipient is entered into the "To" field of the message header. If there are multiple recipients, the email address of each is entered into the "To" field. In additional embodiments, a "CC" or "BCC" field may be used for one or all recipients. In step 62c, a globally unique message ID or number is assigned to the message. In step 62d, other information, such as a conversation name, or the subject of the message, is provided in the header. In step 62e, the start date/time the message was created and possibly the end date/time of the message may be included in the header. In one embodiment, the steps 62a through 62e generally all occur at substantially the same time, with the possible exception of defining the end date/time. In other embodiments, the steps 62a through 62e may occur in any order.

The start and end date/times ordinarily coincide with the implementation of the start function 36/54 and end function 38/56 on the sending device 14 respectively. A sender, however, might not always implement the end function 38/56 for a given message. When this occurs, the sender may simply stop creating and sending time-based media associated with the message. The message may, therefore, remain "open-ended" without a defined end-time/date.

In certain embodiments, the steps 62a through 62e may be performed on a sending communication device 14. In other embodiments, the sending communication device may send some or all of the message header information to a server 16, where the steps 62a through 62e are performed. The time-based media of the message may also be optionally stored on a server 16 for later review by the sending user or transmission to the recipient.

In the embodiments described above, a message header with various fields including a To, From, Message ID number, Conversation Name, and message Start and End time is provided. It should be understood that not all of these fields are necessary, and other fields may be included. The only required information is at least one recipient specified in one of the To, CC, or BCC fields, which defines the globally addressable email address of a recipient. The other fields are all optional.

The format of the message header is also variable. In one embodiment, the structure of the message header may be similar to that used with conventional emails or the enveloped used with emails. In other embodiments, the structure of the message header may take any form that is suitable for transmitting the globally addressable email address of the recipient(s), along with possibly other header information, across the network 12. While specific email header fields are discussed for specifying recipients, the actual header field containing the recipient address information may not necessarily include the globally addressable email address of the recipient per se. As is well known in the art, an "envelope recipient" may be used to specify the email address of the recipient, even though the envelope recipient may differ from the recipients listed in the email headers. Thus as used herein, the term message header should be broadly construed to include both envelope information and conventional message or email headers including any number of fields, such as but not limited to those specified in RFC 822 or 5322. In addition, the usage of the terms "addressing" or "globally addressable email address" is intended to be broadly construed to include any addressing method, including usage in conventional message or email headers or in a message envelope.

The network 12, under certain circumstances, may deliver messages containing time-based media that can (i) be simultaneously and progressively transmitted to a recipient over the network 12 and (ii) reviewed in near real-time by the addressed recipient as the time-based media is being created and sent by the sending user. Under other circumstances, the messages cannot be delivered in real-time. Both the near real-time and non real-time scenarios are discussed below with regard to FIGS. 5A through 5C respectively.

Figure 5A:
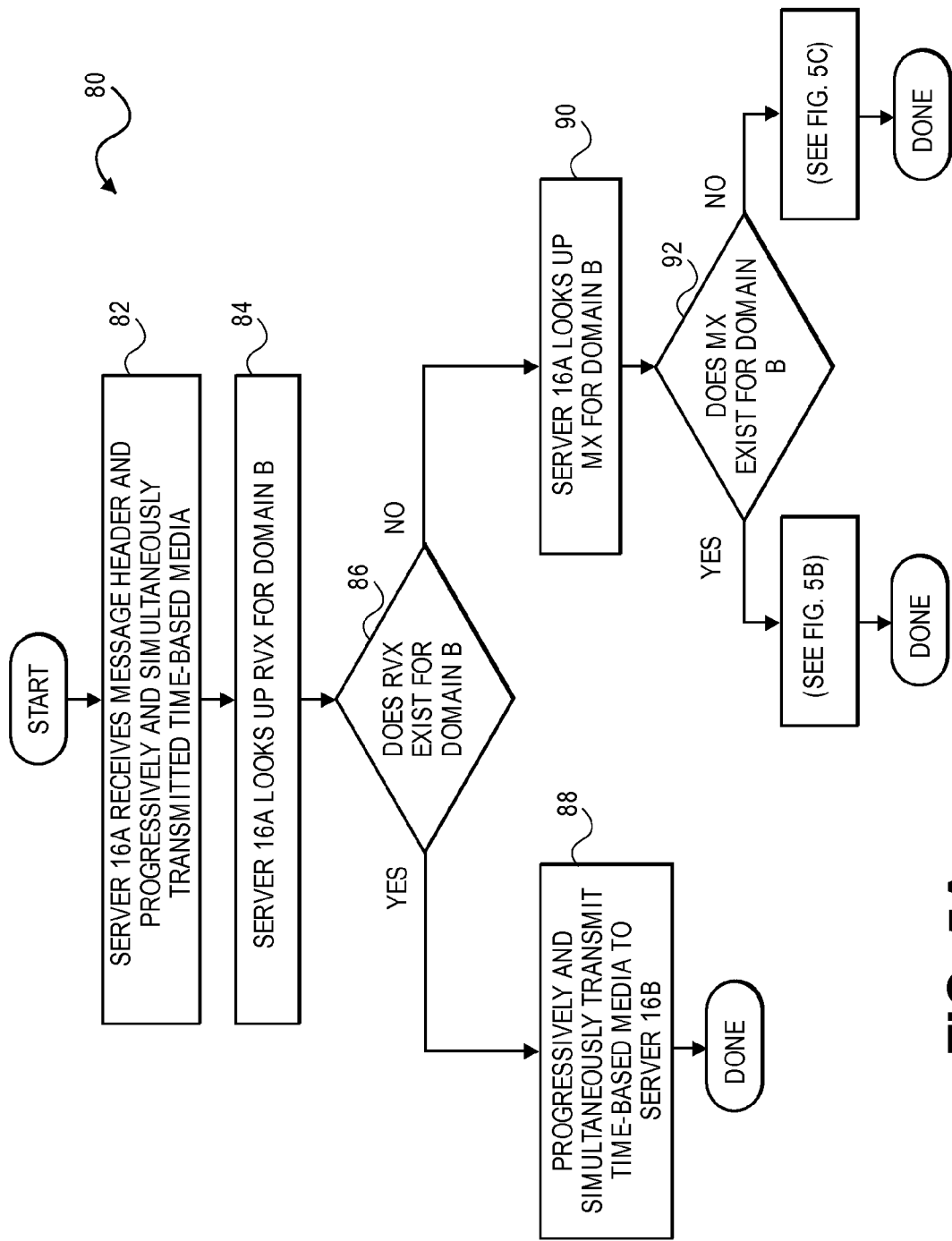
FIGS. 5A through 5D are flow diagrams illustrating the sequence for conducting communication over the network in accordance with the present invention.

Referring to FIG. 5A a flow diagram 80 illustrating the sequence for potentially conducting near real-time communication with messages containing time-based media using a globally addressable email address over the network 12 is shown. The sequence is described in the context of user A sending a message to user B using any near real-time RVX protocol. As noted above, server 16B provides user B with an RVX service, but not the MX service.

In the initial step 82, server 16A receives at substantially the same time the message header (or the header information allowing the server to perform some or all of the steps 62a-62e) and the time-based media of the message to be transmitted as it is being progressively and simultaneously created and transmitted by communication device 14A. As the message header contains user B's globally addressable email address (userB@DomainB) in the "To", "CC", or "BCC" field, server 16A requests a lookup for the RVX of domain B (step 84) of DNS server 18 using the DNS protocol. Since the RVX exists for domain B (decision 86), the lookup result is positive. The time-based media is then progressively and simultaneously sent using the RVX protocol from the server 16A associated with the sender to server 16B associated with the recipient. The time-based media may be transmitted across one or more hops between the two servers 16A and 16B. At each hop, a DNS lookup is performed to discover the delivery route to the next hop, while the RVX protocol is used to deliver the time-based media to each next hop.

In one embodiment, the media is simultaneously and progressively transmitted to the communication device 14B of the recipient when the time-based media arrives at server 16B. The recipient is notified of the incoming message, and in response, the recipient may elect to simultaneously review the media in the near real-time mode as the media of the message is progressively received.

In an alternative embodiment, the media of the message is also optionally placed in an inbox and persistently stored on the recipient device 14B. With the persistent storage of the message, the recipient has the option of reviewing the media in the near real-time mode as the media is received or at an arbitrary later time from storage.

In yet another embodiment, the message may also be stored in an inbox located at the server 16B associated with the user B. In this manner, the user of device 14B may access the message at an arbitrary later time from the inbox on server 16B. In addition, the server 16B may encapsulate the message into a file and attach the file to an email. As noted above, user B is not provided the MX service and therefore cannot receive such an email. But in situations where a user can receive emails, the message can be forwarded in the form of an attachment.

In yet other embodiments, the media of the message may be stored in an out-box of the sending user, either located on the user's sending communication device 14, or on the server 16A associated with the sender.

Figure 5B:
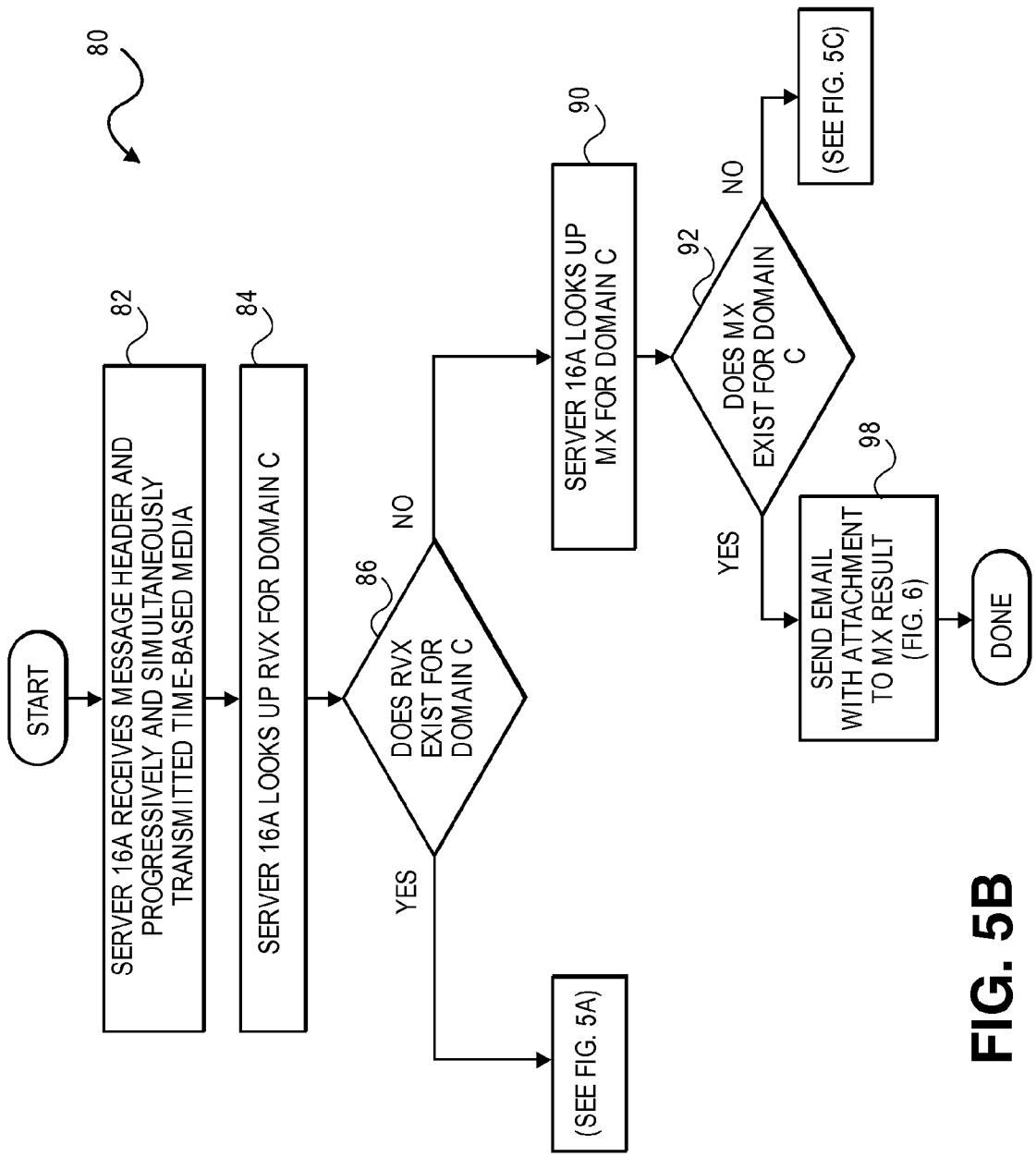

Referring to FIG. 5B, the flow diagram 80 is again provided to illustrate communication between user A and user C. As previously noted, server 16C provides user C with the MX service, but not a real-time RVX service. When user A wishes to communicate with user C, the initial sequence is essentially the same as that described above. Server 16A initially receives a message header (or the header information necessary to optionally perform steps 62a-62e) with the globally addressable email address of user C (userC@domainC) and the progressive and simultaneous transmission of time-based media by user A (step 82). Since the RVX lookup result (decision 86) is negative, server 16A next requests an MX lookup of DNS server 18 for domain C (step 90) using the DNS protocol. With a positive result (decision 92), server 16A sends a conventional email with the time-based media encapsulated as an attachment (step 96) to server 16C. At the server 16C, the email is placed in the recipient's inbox. The email may also be forwarded to an inbox on communication device 14C. Thus when the recipient does not have the RVX service, the time-based media of the message is sent across the network 12 by Server 16A to server 16C, and possibly communication device 14C, using the store and forward procedure of SMTP or a similar proprietary email system.

Figure 5C:
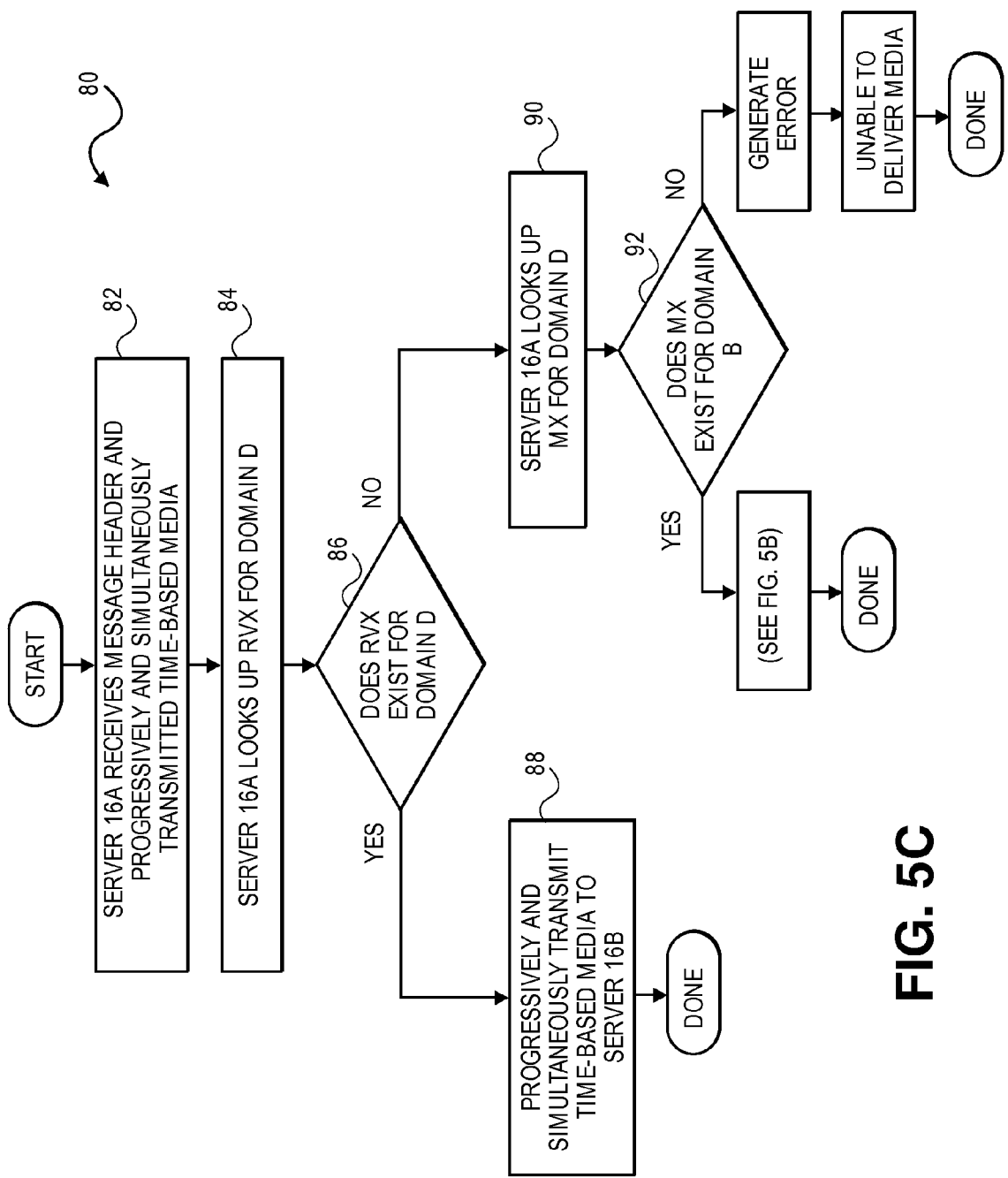

Referring to FIG. 5C, the flow diagram 80 is again provided to illustrate a communication attempt between user A and user D. As previously noted, user D is not provided with either the email MX service or a near real-time RVX service. When user A wishes to communicate with user D, the initial sequence is essentially the same as that described above. Server 16A receives a message header with the globally addressable email address of user D (userD@domainD) (or the header information needed to optionally perform steps 62a through 62e) and the progressive and simultaneous transmission of time-based media by user A (step 82). Since the RVX lookup (decision 86) and the MX lookup for domain D (diamond 92) are both negative, an error message is generated (step 94) and the message cannot be delivered (step 96). In various embodiments, the time-based media of the message may be stored at either the sending communication device 14A, the server 16A, or both. The message may later be sent when the RVX and/or MX service is provided to user D.

The scenario described with regard to FIG. 5C typically occurs if an incorrect email domain name is provided for a recipient. When the sender attempts to send a message using an invalid globally addressable email domain name, the error message (step 94) results. If the correct domain name in the email address is provided, the message can then be forwarded using either an RVX protocol or as an attachment to an email using the MX service.

In an alternative embodiment, the communication devices 14A through 14C may be arranged in a peer-to-peer configuration. With this arrangement, at least the sending communication devices 14 are capable of performing the RVX and/or MX lookups on DNS server 18 directly, without the aid of an intervening server 16 to perform the lookup function. The communication devices 14 may also be capable of transmitting the media of the messages directly to other communication devices. Depending on whether the recipient is a member or not of the RVX and/or MX domains, the sending communication device 14A will either (i) progressively and simultaneously transmit the time-based media of a message to the recipient over the network 12; (ii) encapsulate the time-based media of the message into a file and transmit an email including the file as an attachment to the recipient using SMTP or a similar proprietary protocol; (iii) or receive an error message if an invalid globally addressable user name or domain name was used in the email address and/or the recipient is not provided the MX service.

Figure 5D:
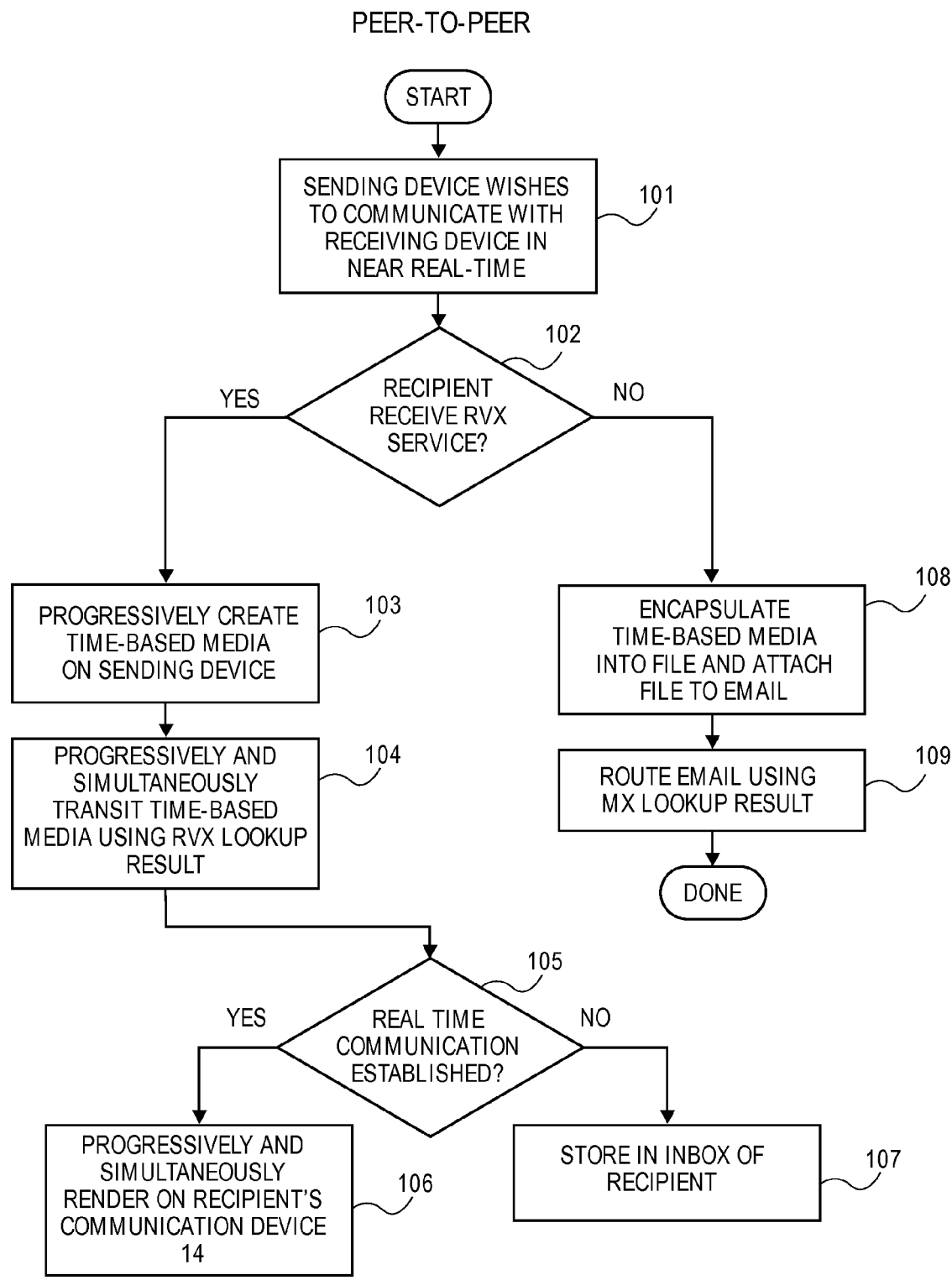

Referring to FIG. 5D, a flow diagram 100 illustrating the peer-to-peer embodiment is illustrated. In the initial step 101, a sending communication device 14 indicates that it would like to communicate with a receiving communication device 14. In decision diamond 102, the communication device 14 of the sender performs a DNS lookup of the recipient's globally addressable email address to determine if the peer recipient receives the RVX service. If the result of the look up is positive, then the time-based media created (step 103) using the sending communication device 14 is progressively and simultaneously transmitted (step 104) to the recipient using the delivery route defined by the RVX lookup. In decision diamond 105, it is determined if real-time communication is established. If yes, then the transmitted media is progressively and simultaneously rendered at the communication device 14 of the recipient as the media is received (box 106). If near real-time communication is not established, then the media of the message is placed in the inbox of the recipient (box 107), either on the device 14 of the recipient, a server 16 associated with the recipient, or possible both. Near real-time communication may not take place with the recipient for a number of reasons, such as the recipient is not available, out of network range, or has indicated a desire to not review the message in the near real-time mode.

On the other hand if the recipient does not receive the RVX service (decision 102), then the media of the message is delivered in the form of an attachment to an email, provided the recipient receives the MX domain service. The time-based media is encapsulated into a file and attached to an email (step 108). When the message is complete, the email is transmitted using the route defined by the MX lookup result (step 109). In one embodiment, the email may be sent directly from the sending peer if the sending communication device 14 is locally running an email client. The email may be received either at the recipient peer device 14 if running an email client, at a server 16 running an email client on behalf of the recipient or possibly both the receiving peer 14 and server 16. In situations where both peers are running an email client, media may be sent in the form of an attachment to an email from the sending communication device 14 to the receiving communication device 14. This differs from known telephone messaging systems, where a server, as opposed to a sending peer, emails a voice message to the recipient. In certain embodiments, an attachment may be substituted or augmented by a link to a web page containing the time-based media, as described in more detail below.

It should be noted that the discussion above with regard to FIGS. 4A, 4B and 5A through 5C has been simplified to illustrate certain aspects of the invention. It should be understood that actual implementations could be modified in several ways. For example, each time the server 16A received an email address, the server 16A would first determine if the domain of the recipient (i.e., domain A, domain B or domain C), is within one or more local domains of the server 16A. If not, then the procedures described above with regard to FIGS. 5A, 5B and 5C are performed respectively. On the other hand if the domain of the recipient is within a local domain of the server 16A, then the server 16A may deliver the message either (i) in real-time if the recipient receives a real-time communication service or (ii) as an attachment to an email if the recipient receives the MX service, but not a real-time service. In addition, it may not be necessary for the Server 16A to perform a DNS lookup in each instance. As is well known, previous DNS lookup results may be cached and used upon rather than performing a new DNS lookup each time an email address of a recipient is received.

Figure 6:
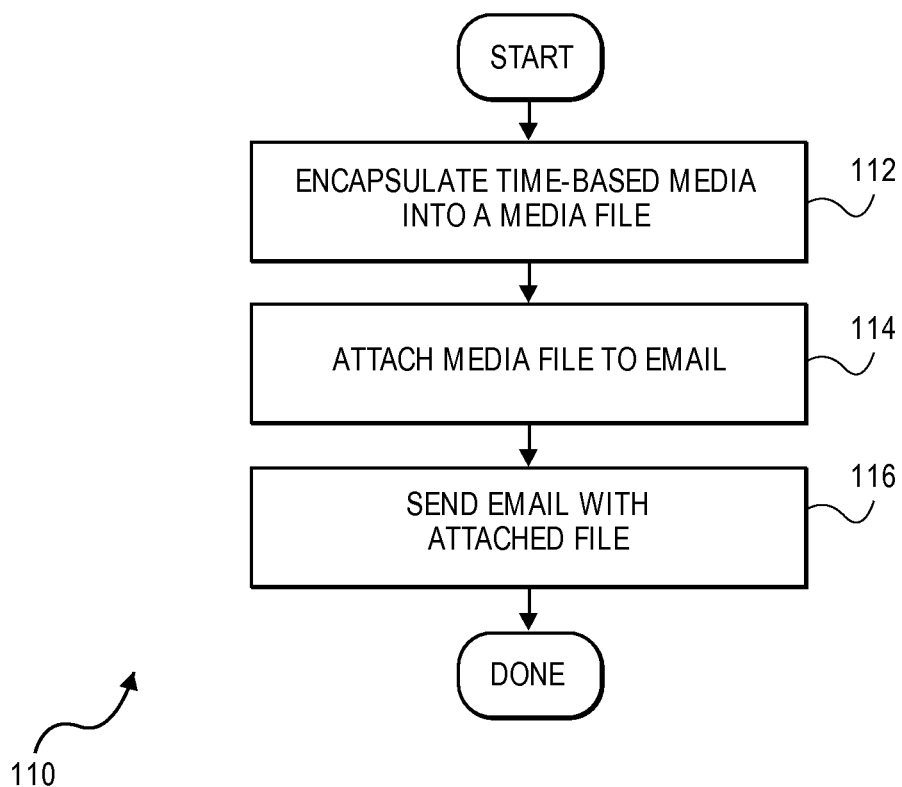
FIG. 6 is a flow diagram illustrating the attachment of a media file to an email according to the present invention.

Referring to FIG. 6, a flow diagram 110 illustrating the sequence for sending time-based media encapsulated in an email attachment at server 16A (box 98 in FIG. 5B) or from a sending device 14A (box 107 in FIG. 5D) is shown. In either case, time-based media generated by user A is encapsulated in a file (step 112) and is attached to the email (step 114) when the message is complete, for example when the end function 38/56 is implemented. In situations where the end function 38/56 is not implemented, the end of the message may be declared by default, after a predetermined period of time lapses without the creation of any new time-based media. Once the time-based media of the message is complete, either by the implementation of the end function 38/56 or by default, the email with the attachment is then transmitted (step 116) by server 16A or communication device 14A to the MX lookup result of the recipient over the network 12 using the SMTP or a similar proprietary protocol, in a manner similar to a conventional email.

With either the server or peer-to-peer models described above, the RVX lookup result is initially used to deliver the time-based media. If the RVX attempt fails, then the MX result is used as a backup. With this arrangement, a conventional email with the time-based media included in an attachment and/or web link is used to deliver the media in circumstances where the recipient is not provided RVX service. The email may be created either on a server or on the sending device.

II. Delivery Options

Figure 7:
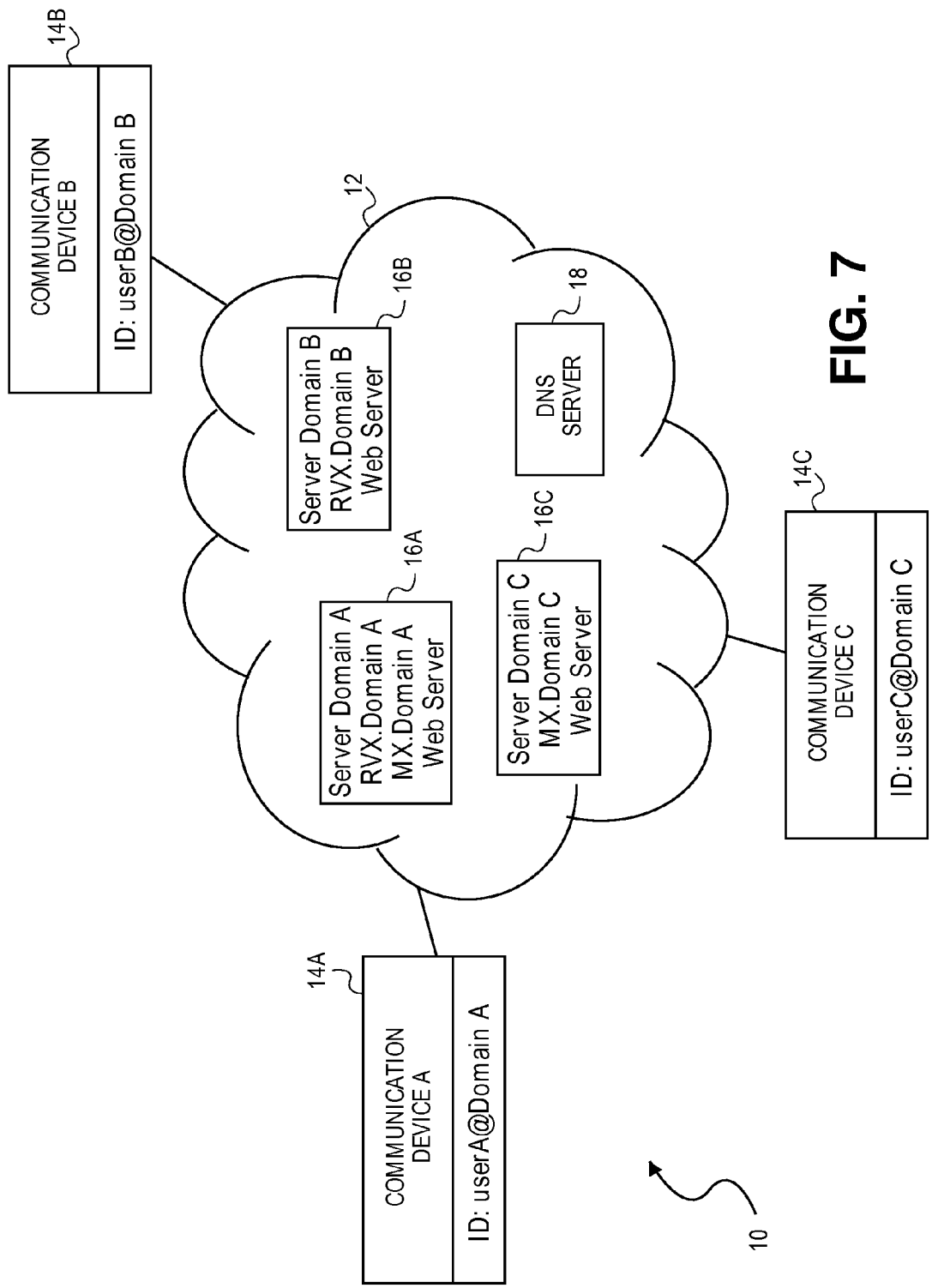
FIG. 7 is a diagram illustrating the delivery of time-based media over the network according to another embodiment of the present invention.

Referring to FIG. 7, a diagram illustrating the delivery of time-based media over the network 12 according to another embodiment of the present invention is shown. With this embodiment, the network 12 is essentially the same as that described above with regard to FIG. 1, with at least one exception. One or more of the servers 16A-16C are configured as web servers, in addition to providing the RVX and/or MX services as described above. With this embodiment, users receive an email from their respective server 16 containing a URL link when a message is sent to them. When the user selects the link through a web browser running on their communication device 14, the appropriate web server 16 serves up web pages allowing the recipient to access and review the message. The served web pages may also provide a variety of rendering options, such as review the media of the message in either the real-time or time-shifted modes, catch up to live, pause a live conversation, jump to the head of a conversation, jump to a previous point in time of the conversation, render faster, render slower, jump between different conversations, etc. In the figure, the web server functionality is provided as one of the services provided by Servers 16A, 16B and 16C. In an alternative embodiment, the web server functionality can be implemented using one or more other servers (not illustrated) on the network 12 besides 16A, 16B or 16C.

III. Email Protocol Modifications and Progressive Emails

The messages as described above are routed using globally addressable email address and the DNS infrastructure for defining a delivery route, while using an RVX protocol for the actual delivery of the time-based media in near real-time. Although the SMTP standard and other proprietary email protocols as currently defined and used are store and forward protocols, with certain modifications, SMTP and other proprietary email protocols could be used as an RVX messaging protocol for the near real-time delivery of time-based media as contemplated in the present application. With conventional emails, the media content must be composed in full and packaged before the email can be sent. On the receiving end, the email must be received in full before the recipient can review it. As described in detail below, SMTP, Microsoft Exchange or any other proprietary email protocol may be used for creating "progressive" emails, where media may be sent in near real-time.

The existing email infrastructure can be used to support the near real-time transmission of time-based media by modifying the way the SMTP, Microsoft Exchange or other proprietary email protocols (hereafter generically referred to as an email protocol or protocols) are used on the sending side and modifying the way that emails are retrieved from the server on the receiving side. Current email protocols do not strictly require that the entire message be available for sending before delivery is started, although this is typically how email protocols are used. Time-based media can therefore be delivered progressively, as it is being created, using standard SMTP, Microsoft Exchange or any other proprietary email protocol.

Email is typically delivered to user devices through an access protocol like POP or IMAP. These protocols do not support the progressive delivery of messages as they are arriving. However, by making simple modifications to these access protocols, a message may be progressively delivered to a recipient as the media of the message is arriving over the network. Such modifications include the removal of the current requirement that the email server know the full size of the email message before the message can be downloaded to the client. By removing this restriction, a client may begin downloading the time-based media of an email message as the time-based media of the email message is received at the server over the network.

Referring to FIG. 8, the structure of a conventional prior art email 120 using any of the above listed email protocols is illustrated. The email 120 includes a header 122 and a body 124. The header includes a "To" (or possibly the CC and/or BCC fields) field, a "From" field, a unique global ID number, a subject field, optional Attachments, and a Date/time stamp. The body 124 of the email includes the media to be transmitted, which typically includes a typed message and possibly attached files (e.g. documents or photos). When complete, the email is sent. A DNS lookup is performed and the email is routed to the recipient. Conventional emails are "static", meaning the body of the email, including attachments, is fixed once transmission starts. There is no way to progressively and simultaneously transmit with conventional emails time-based media as the media is being created. Prior art emails 120 are therefore incapable of supporting near real-time communication.

Referring to FIG. 9, the structure of an email 130 according to the present invention is shown. Email message 130 is used for supporting near real-time communication. The email 130 includes a header 132 including a "To" field (and possibly the CC and/or BCC fields) and a body 134. The structure of email 130, however, differs from a conventional prior art email 120 in at least two regards. First, the header 132 includes an email Start date/time and an End date/time. By associating a start and end time with an email 130, as opposed to just a date/time stamp when an email 120 is sent, the second difference may be realized. After an email 130 is created and the sender defines a globally addressable email address of the recipient, the DNS lookup for routing is immediately performed. At substantially the same time, time-based media may be created. As the time-based media is created, it is progressively and simultaneously transmitted to the DNS lookup result, from hop to hop, using the streaming nature of SMTP, Microsoft Exchange or any other type of email protocol. The body 134 of email 130 is therefore "progressive". As time-based media associated with an email message 130 is dynamically created, the time-based media is simultaneously and progressively transmitted to the email server of the recipient, from hop to hop across the network when necessary. If an email 130 is sent to multiple recipients, regardless if identified in the To, CC or BCC fields, the above process is repeated for each.

The DNS lookup is immediately performed right after the email address of the recipient is defined by initiating an email protocol session with the email server associated with the sender. This differs from conventional emails 120, where the email protocol session is typically initiated only after the email has been composed in full and the sender implements a "send" function. As a result, the delivery route can be discovered either before or concurrent with the progressive and simultaneous transmission of time-based media as it is being created. In situations where time-based media is created before the session is established, the time-based media may be either temporarily or persistently stored as the media is created. The stored media may then be progressively transmitted from storage once the protocol session with the email server is established.

The End date/time of email 130 may be either defined or open-ended. When the sender implements the end function 38/56 on the communication device 14, then the end time of the email 130 is defined. If the end function 38/56 is never implemented, then the duration of the email 130 is "open-ended" and does not necessarily have a defined end date/time. Open-ended emails 130 are therefore typically terminated by default after a predetermined period of time where no media is created.

In summary, progressive emails 130 can be sent using SMTP, Microsoft Exchange or any other email protocol by implementing the above-described modifications. Similarly, recipients may simultaneously and progressively review the time-based media of progressive emails 130 by modifying access protocols such as POP, IMAP and the like. Together, these modifications enable the use of email addressing, email protocols, DNS and the existing email infrastructure to support real-time communication of time-based media.

IV. Late Binding of Recipient Addresses for Real-Time Voice and Other Time-Based Media In the context of communications, a recipient address can be described as "bound" when a valid delivery path through the network has been determined for that address. Conventional telephone calls over the PSTN are said to use "early binding" because the dialed phone number, the "recipient address" in this case, is used to establish some active path (i.e., a circuit connection) to the recipient before any media can be transmitted to the recipient. Only after the connection is made can the caller begin speaking and the media transmitted. Regardless if the call is placed to one or more telephone numbers, or the call is transferred a voice messaging system, the binding typically occurs before any words can be delivered. Since the binding of the recipient's address to an active destination on the network happens before any transmission of media, it is said to be "early". In contrast, emails are said to employ "late" binding. A person may compose an email message and send it over a network without binding that message to the device on which the recipient will consume it. Instead, after the email is composed, the email address of the recipient is used to route the email to the recipient to be reviewed on a device and at a time of the recipient's choosing.

With the messages (as described with regard to FIGS. 4A, 4B and 5A-5D) or emails 130 described above, a user may address a recipient using their globally addressable email address and then immediately begin talking or generating time-based media. As described above, the DNS lookup to define the delivery route is performed immediately, as soon as the email address of the recipient is defined. At substantially the same time, any available time-based media is progressively and simultaneously transmitted across the network 12 to the recipient. Thus the discovery of an active delivery route and the progressive and simultaneous creation, transmission and delivery of the time-based media occur at substantially the same time as the time-based media is created. In the event the actual delivery route is discovered after the creation of time-based media has started, then the media may be temporarily or persistently stored and then transmitted from storage once the active delivery route is defined. No network connection or circuit needs to be established before the user may start talking. The ability to progressively and simultaneously transmit the time-based media using DNS and the infrastructure of email therefore enables the late binding of recipient addresses for voice and other time-based media in a manner that previously was not possible.

V. Conversations

The messaging method and system as described (with regard to FIGS. 1-3, 4A-4B and 5A-5D) is conducive for supporting conversations between sending and receiving users. When two or more parties are conversing back and forth using any of the above-listed RVX protocols, such as VoIP, SIP, RTP, or Skype, then the conversation may take place in the live near real-time mode. When the RVX protocol allows users to communicate time-based media in near-real-time, but does not require the recipient to review the time-based media in near real-time, such as with the CTP or synchronization protocols mentioned above, then the conversation may take place (i) in the near real-time mode; (ii) the time-shifted mode; or (iii) seamlessly transition between the two modes.

Reply messages may be routed in a number of different ways. For example, with the CTP and synchronization protocols, the globally addressable email addresses of the participants along with the DNS routing information may be embedded in the streaming media. When a reply is to be sent, the embedded address and routing information is used for the reply message. Alternatively, messages may be routed using a conversation ID or other pointer included in the streaming media which points to the globally recognizable email addresses of the participants along with the DNS routing information. In yet another alternative, the participants may be explicitly addressed and a DNS lookup performed for the reply message.

The progressive email 130 embodiment described above can also be used for implementing conversations. When a conversation is initiated, an email 130 is created by the sender, at either the sending communication device 14 if running an email client or on a mail server on the network running an email client on behalf of the sender. As the media of the progressive email 130 is created, it is progressively transmitted to the recipient, using the routing defined by DNS. To reply, a progressive email 130 is created on behalf of the recipient, either on the recipient's device 14 or on a server running an email client on behalf of the recipient. The email address of the original sender is automatically inserted in the "To" field (or possibly the CC and/or BCC fields) of the return email 130 and the DNS lookup is performed. The media associated with the return email may be transmitted using the streaming feature of SMTP, Microsoft Exchange, or another proprietary email protocol as soon as the media is created. Recipients may simultaneously review the time-based media in near real-time as the media is progressively received at their email client.

Regardless of the embodiment, the "reply" function may be implemented in a variety ways. For example, the recipient may enter an explicit reply command into their communication device 14, such as by using a predefined voice or keystroke command, or entering a command through a touch screen. Alternatively, a reply message or email may be generated automatically when the recipient begins speaking or generating other time-based media in response to an incoming message or email 130. When a reply message is automatically created, the email address of the original sender is extracted from the incoming message and used for addressing the reply message.

In yet other embodiments, the RVX protocol used for sending and receiving the messages of a conversation between participants do not necessarily have to be the same. For example, one participant may send messages using one of the CTP, synchronization, progressive emails, VoIP, SIP, RTP, or Skype protocols, whereas other participants may use a different one of the listed protocols, provided some type of a common conversation identifier is used. Any messages, regardless of the protocol used for transmission, are linked or threaded together using the unique conversation identifier.

In various further embodiments, conversations can be defined using a variety of criteria. For example, conversations may be defined by the name of a person (e.g., mom, spouse, boss, etc) or common group of people (e.g., basketball team, sales team, poker buddies, etc). Conversations may also be defined by topic, such as fantasy football league, ACME corporate account, or "skunk works" project. Regardless of the contextual attribute used to define a conversation, the ability to link or organize the messages of a particular conversation together creates the notion of a persistent or ongoing conversation. With a conventional telephone call, the conversation typically ends when the parties hang up. There is no way to contextually link, organize and possibly store the spoken words of multiple telephone conversations between the same parties. On the contrary, conversations, as defined herein, are a set of common messages linked together by a common attribute. So long as messages are added to the conversation, the conversation is continuous or ongoing. This attribute makes it possible for a participant to contribute to a conversation at any arbitrary time. For example, a user may select a conversation among a list of conversations and contribute a message to the selected conversation at anytime. The message is then sent to all the conversation participants. Messages are therefore not necessarily sent when either a conversation is first created or in reply to an incoming message.

VI. Implementation Embodiments

The messaging methods as described with regard to FIGS. 1-3, 4A-4B and 5A-5D and progressive emails 130 may be implemented in a variety of ways. For example, cell phone and other mobile communication service providers may provide users with peer-to-peer mobile communication devices that operate using either messages and/or progressive emails 130. In addition, these service providers may also maintain a network 12 of servers 16 for receiving messages and/or emails 130 from non peer-to-peer communication devices, creating messages, performing DNS lookup operations and for routing the time-based media of messages using any one or possibly multiple RVX protocols. In yet another embodiment, the messaging and progressive email 130 methods may be embedded in a software application that is intended to be loaded into and executed on conventional telephones, mobile or cellular telephones and radios, mobile, desktop and laptop computers. In each of these cases, the application enables the device to send, receive and process messages and progressive emails 130 as described herein. In yet other implementations, an email client can be modified to create, receive and process progressive emails 130. The email client may alternatively reside on a server on the Internet or other network, on sending or receiving devices, or both.

Although the above-described email methods were generally described in the context of a single sender and a single recipient (as discussed with regard to FIGS. 4A-4B and 5A-5D) or emails 130 to a single recipient, it should be understood the messages and/or emails 130 might be simultaneously sent to multiple parties. Each recipient will either receive or not receive the message or email, depending on their status, as described above. As described in more detail in the above-mentioned U.S. applications, the media may be rendered using a number of different rendering options, such as catch up to live, pause a live conversation, jump to the head of a conversation, jump to a previous point in time of the conversation, render faster, render slower, jump between different conversations, etc. The time-based media exchanged by the messages and/or emails is not limited to just voice or video. In addition, the time-based media may be delivered to a recipient in a different form than it was created. For example, a voice message may be transcribed into a text file or a message in English may be translated into another language before being delivered to the recipient. Any media that varies over time, such as sensor data, GPS or positional information, may be transmitted. While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the invention, as provided in the attached claims.

What is claimed is:

1. A method performed on a communication device configured to be connected to a communication network, the method comprising:
   receiving input from a user for initiating creation of a voice message to a first recipient;
   creating, in response to the received input from the user, the voice message on the communication device, the voice message having a message header containing an identifier associated with the first recipient of the message and a message body for transporting voice media associated with the voice message;
   progressively transmitting the message header to a node on the communication network when the identifier is defined, the node on the network using the identifier to discover at least a partial delivery route for delivering the voice media of the voice message over the communication network to the first recipient; and
   progressively transmitting the message body to the node on the communication network as the voice media is created so that the node can progressively transmit the voice media of the voice message to the first recipient over the at least partially discovered delivery route,
   wherein the progressive transmission occurs without requiring generation of a request for permission to transmit the voice message and without requiring receipt of a permission grant signal over the network for granting permission to transmit the voice message.

2. The method of claim 1, further comprising starting the progressive transmission of the voice media in the message body to the node before the voice message is complete.

3. The method of claim 1, further comprising starting the progressive transmission of the voice media in the message body before a complete delivery route to the first recipient is discovered.

4. The method of claim 1, further comprising starting the progressive transmission of the voice media in the message body before a complete delivery route binding the communication device and a second communication device associated with the first recipient is established.

5. The method of claim 1, wherein the progressive transmission of the voice media of the voice message further comprises streaming the voice media of the voice message over the communication network as the discovery of the delivery route occurs and as the voice media is created and dynamically added to the message body.

6. The method of claim 1, wherein the progressive transmission of the voice media in the message body further comprises progressively transmitting the voice media to the first recipient as one or more hops on the communication network is/are discovered.

7. The method of claim 1, wherein the progressive transmission of the message header and body further comprises using a transmission protocol that supports near real-time communication.

8. The method of claim 7, wherein the transmission protocol comprises one of the following:
   (i) RTP;
   (ii) VoIP;
   (iii) a real-time communication protocol that operates over an IP network; or
   (iv) emails where the voice media is progressively transmitted as the voice media is created.

9. The method of claim 1, wherein the identifier uniquely identifies the first recipient on the communication network.

10. The method of claim 1, wherein the identifier is an email address associated with the first recipient.

11. The method of claim 1, wherein discovering the at least partial delivery route to the first recipient further comprises using a lookup result of the identifier to determine the next hop on the communication network for delivering the voice media of the voice message to the first recipient.

12. The method of claim 11, wherein the lookup result is either:
   (i) an active lookup result of the identifier; or
   (ii) a cached result of a previous lookup of the identifier.

13. The method of claim 1, wherein progressively transmitting the message header and the message body further comprises progressively transmitting the message header and the message body from storage located on the communication device when the communication device was disconnected from the communication network or unable to transmit when the message header and the voice media of the message body were created.

14. The method of claim 1, wherein the delivery route to the first recipient is to one or more second communication devices associated with the first recipient.

15. The method of claim 1, wherein the message is a message transmission by a Push-To-Talk capable device.

16. The method of claim 1, wherein the identifier is a non-IP address identifier.

17. The method of claim 1, further comprising establishing a session between the communication device and the node over the communication network.

18. The method of claim 1, further comprising progressively storing the voice media of the voice message on the communication device as the voice media is created, dynamically added to the message body, and progressively transmitted.

19. The method of claim 1, wherein the identifier is defined by one of the following:
   (i) selecting the first recipient from a list of contacts;
   (ii) manually entering a name associated with the first recipient into the communication device; or
   (iii) in reply to a previous voice message from the first recipient.

20. The method of claim 1, wherein progressive transmission of the voice media in the message body further comprises transmitting the voice message to the first recipient over the communication network in near real-time so that the first recipient can render the voice media in near real-time.

21. The method of claim 1, further comprising progressively receiving over the communication network at the communication device an incoming voice message from the first recipient.

22. The method of claim 21, further comprising progressively storing voice media of the incoming voice message as the incoming voice message is progressively received.

23. The method of claim 21, further comprising selectively rendering voice media of the incoming voice message in both:
   (i) a near real-time mode as the voice media of the incoming voice message is progressively received; and
   (ii) in a time-shifted mode by retrieving and rendering the voice media of the incoming voice message from storage.

24. The method of claim 1, further comprising enabling live communication between the communication device and the first recipient.

25. The method of claim 1, further comprising selectively enabling between the communication device and the first recipient (i) near real-time communication, (ii) time-shifted communication and (iii) the ability to transition between (i) and (ii).

26. The method of claim 1, further comprising enabling peer-to-peer communication of the voice message between the communication device and the first recipient.

27. The method of claim 1, further comprising adding the voice message to a conversation by linking the voice message with another voice message of the conversation.

28. The method of claim 1, further comprising progressively and persistently storing on the communication device the voice media of the voice message as the voice media is created.

29. A communication device configured to be connected to a communication network, the device comprising:
   an interface for receiving input from a user for initiating creation of a voice message to a first recipient;
   a messaging element configured to create, in response to the received input from the user, the voice message on the communication device, the voice message having a message header for containing an identifier associated with the first recipient of the message and a message body for transporting voice media associated with the voice message; and
   a transmitter configured to:
      (i) progressively transmitting the message header to a node on the communication network when the identifier is defined, the node on the network using the identifier to discover at least a partial delivery route for delivering the voice message over the communication network to the first recipient; and
      (ii) progressively transmitting the message body to the node on the communication network, as the voice media is created and added to the message body, so that the node can progressively transmit the voice media of the voice message to the first recipient over the at least partially discovered delivery route,
   wherein the progressive transmission occurs without requiring generation of a request for permission to transmit the voice message and without requiring receipt of a permission grant signal over the network granting permission to transmit the voice message.

30. The communication device of claim 29, wherein the transmitter is further configured to start the progressive transmission of the voice media in the message body to the node before the voice message is complete.

31. The communication device of claim 29, wherein the transmitter is further configured to start the progressive transmission of the voice media in the message body before a complete delivery route to the first recipient is discovered.

32. The communication device of claim 29, wherein the transmitter is further configured to start the progressive transmission of the voice media in the message body before a complete delivery route binding the communication device and a second communication device associated with the first recipient is established.

33. The communication device of claim 29, wherein the transmitter is further configured to progressively stream, during the transmission, the voice media of the voice message over the communication network as the discovery of the delivery route occurs and as the voice media is created and dynamically added to the message body.

34. The communication device of claim 29, wherein the transmitter is further configured to progressively transmit the voice media to the first recipient as one or more hops on the communication network is/are discovered.

35. The communication device of claim 29, wherein the transmitter uses a transmission protocol that supports near real-time communication.

36. The communication device of claim 35, wherein the transmission protocol comprises one of the following:
   (i) RTP;
   (ii) VoIP;
   (iii) a real-time communication protocol that operates over an IP network; or
   (iv) emails where the voice media is progressively transmitted as the voice media is created.

37. The communication device of claim 29, wherein the identifier uniquely identifies the first recipient on the communication network.

38. The communication device of claim 29, wherein the identifier is an email address associated with the first recipient.

39. The communication device of claim 29, wherein discovering the at least partial delivery route to the first recipient further comprises using a lookup result of the identifier to determine the next hop on the communication network for delivering the voice media of the voice message to the first recipient.

40. The communication device of claim 39, wherein the lookup result is either:
   (i) an active lookup result of the identifier; or
   (ii) a cached result of a previous lookup of the identifier.

41. The communication device of claim 29, wherein the transmitter is further configured to progressively transmit the message header and the message body from storage located on the communication device when the communication device was disconnected from the communication network or unable to transmit when the message header and the voice media of the message body were created.

42. The communication device of claim 29, wherein the delivery route to the first recipient is to one or more second communication devices associated with the first recipient.

43. The communication device of claim 29, wherein the voice message is a message transmission by a Push-To-Talk capable device.

44. The communication device of claim 29, wherein the identifier is a non-IP address identifier.

45. The communication device of claim 29, further comprising a session element configured to establish a session between the communication device and the node over the communication network.

46. The communication device of claim 29, further comprising a storage element configured to progressively store the voice media of the voice message on the communication device as the voice media is created, dynamically added to the message body, and progressively transmitted.

47. The communication device of claim 29, wherein the identifier is defined by one of the following:
  (i) selecting the first recipient from a list of contacts;
  (ii) manually entering a name associated with the first recipient into the communication device; or
  (iii) in reply to a previous voice message from the first recipient.

48. The communication device of claim 29, wherein the transmitter is further configured to transmit the voice message to the first recipient over the communication network in near real-time so that the first recipient can render the voice media in near real-time.

49. The communication device of claim 29, further comprising a receiver configured to progressively receive over the communication network an incoming voice message from the first recipient.

50. The communication device of claim 49, further comprising a storage element configured to progressively store voice media of the incoming voice message as the incoming voice message is progressively received.

51. The communication device of claim 49, further comprising a render element configured to selectively render voice media of the incoming voice message in both:
  (i) a near real-time mode as the voice media of the incoming voice message is progressively received; and
  (ii) in a time-shifted mode by retrieving and rendering the voice media of the incoming voice message from storage.

52. The communication device of claim 29, wherein the device is further configured to engage in live communication with the first recipient.

53. The communication device of claim 29, wherein the device is further configured to selectively enable between the communication device and the first recipient (i) near real-time communication, (ii) time-shifted communication and (iii) the ability to transition between (i) and (ii).

54. The communication device of claim 29, wherein the communication device is further configured to engage in peer-to-peer communication with the first recipient.

55. The communication device of claim 29, wherein the transmitter is further configured to add the voice message to a conversation by linking the voice message with another voice message of the conversation.

56. The communication device of claim 29, further configured to progressively and persistently store on the communication device the voice media of the voice message as the voice media is created.

57. Computer code, embedded in a non-transitory computer readable medium and intended to be executed on a communication device connected to a communication network, the code configured to:
  receive input from a user for initiating creation of a voice message to a first recipient;
  create, in response to the received input from the user, the voice message on the communication device, the voice message having a message header containing an identifier associated with the recipient of the message and a message body for transporting voice media associated with the voice message;
  progressively transmit the message header to a node on the communication network when the identifier is defined, the node on the network using the identifier to discover at least a partial delivery route for delivering the voice media of the voice message over the communication network to the first recipient; and
  progressively transmit the message body to the node on the communication network, as the voice media is created and added to the message body, so that the node can progressively transmit the voice media of the voice message to the first recipient over the at least partially discovered delivery route;
  wherein the progressive transmission occurs without requiring generation of a request for permission to transmit the voice message and without requiring receipt of a permission grant signal over the network granting permission to transmit the voice message.

58. The computer code of claim 57, wherein the code is further configured to start the progressive transmission of the voice media in the message body to the node before the voice message is complete.

59. The computer code of claim 57, wherein the code is further configured to start the progressive transmission of the voice media in the message body before a complete delivery route to the first recipient is discovered.

60. The computer code of claim 57, wherein the code is further configured to start the progressive transmission before a complete delivery route binding the communication device and a second communication device associated with the first recipient is established.

61. The computer code of claim 57, wherein the code is further configured to progressively stream during the transmission the voice media as the discovery of the delivery route occurs and as the voice media is created and dynamically added to the message body.

62. The computer code of claim 57, wherein the code is further configured to progressively transmit the voice media in the message body to the first recipient as one or more hops on the communication network is/are discovered.

63. The computer code of claim 57, wherein the code uses a transmission protocol that supports near real-time communication.

64. The computer code of claim 63, wherein the transmission protocol comprises one of the following:
  (i) RTP;
  (ii) VoIP;
  (iii) a real-time communication protocol that operates over an IP network; or
  (iv) emails where the voice media is progressively transmitted as the voice media is created.

65. The computer code of claim 57, wherein the identifier uniquely identifies the first recipient on the communication network.

66. The computer code of claim 57, wherein the identifier is an email address associated with the first recipient.

67. The computer code of claim 57, wherein discovering the at least partial delivery route to the first recipient further comprises using a lookup result of the identifier to determine the next hop on the communication network for delivering the voice media of the voice message to the first recipient.

68. The computer code of claim 67, wherein the lookup result is either:
(i) an active lookup result of the identifier; or
(ii) a cached result of a previous lookup of the identifier.

69. The computer code of claim 57, wherein the code is further configured to progressively transmit the message header and the message body from storage located on the communication device when
network permit; and
the communication device was disconnected from the communication network or unable to transmit when the message header and the voice media of the message body were created.

70. The computer code of claim 57, wherein the delivery route to the first recipient is to one or more second communication devices associated with the first recipient.

71. The computer code of claim 57, wherein the message created by the code is a message transmission by a Push-To-Talk capable device.

72. The computer code of claim 57, wherein the identifier is a non-IP address identifier.

73. The computer code of claim 57, wherein the code is further configured to establish a session between the communication device and the node over the communication network.

74. The computer code of claim 57, wherein the code is further configured to progressively store the voice media of the voice message on the communication device as the voice media is created, dynamically added to the message body, and progressively transmitted.

75. The computer code of claim 57, wherein the code is configured to define the identifier in accordance with one of the following:
(i) in response to a selection of the first recipient from a list of contacts;
(ii) in response to a manual entry of a name associated with the first recipient; or
(iii) in reply to a previous voice message from the first recipient.

76. The computer code of claim 57, wherein the code is further configured to transmit the voice message to the first recipient over the communication network in near real-time so that the first recipient can render the voice media in near real-time.

77. The computer code of claim 57, wherein the code is further configured to progressively receive over the communication network at the communication device an incoming voice message from the first recipient.

78. The computer code of claim 77, wherein the code is further configured to progressively store voice media of the incoming voice message as the incoming voice message is progressively received.

79. The computer code of claim 77, wherein the code is further configured to selectively render voice media of the incoming voice message in both:
(i) a near real-time mode as the voice media of the incoming voice message is progressively received; and
(ii) in a time-shifted mode by retrieving and rendering the voice media of the incoming voice message from storage.

80. The computer code of claim 57, wherein the code is further configured to enable live communication between the communication device and the first recipient.

81. The computer code of claim 57, wherein the code is further configured to selectively enable between the communication device and the recipient (i) near real-time communication, (ii) time-shifted communication and (iii) the ability to transition between (i) and (ii).

82. The computer code of claim 57, wherein the code is further configured to support peer-to-peer communication of the voice message between the communication device and the first recipient.

83. The computer code of claim 57, wherein the code is further configured to add the voice message to a conversation by linking the voice message with another voice message of the conversation.

84. The computer code of claim 57, further configured to progressively and persistently storing on the communication device the voice media of the voice message as the voice media is created.

* * * * *